(12) United States Patent
Athanasiou

(10) Patent No.: US 12,112,472 B2
(45) Date of Patent: Oct. 8, 2024

(54) ARTIFACT REMOVAL FROM MULTIMODALITY OCT IMAGES

(71) Applicant: CANON U.S.A., INC., Melville, NY (US)

(72) Inventor: Lampros Athanasiou, Medford (MA)

(73) Assignee: Canon U.S.A., Inc., Melville, NY (US)

( * ) Notice: Subject to any disclaimer, the term of this patent is extended or adjusted under 35 U.S.C. 154(b) by 540 days.

(21) Appl. No.: 17/500,583

(22) Filed: Oct. 13, 2021

(65) Prior Publication Data

US 2023/0115191 A1    Apr. 13, 2023

(51) Int. Cl.
| | |
|---|---|
| G06T 7/00 | (2017.01) |
| G06T 5/50 | (2006.01) |
| G06T 5/60 | (2024.01) |
| G06T 5/70 | (2024.01) |

(52) U.S. Cl.
CPC .. *G06T 7/0012* (2013.01); *G06T 2207/10064* (2013.01); *G06T 2207/10101* (2013.01); *G06T 2207/20081* (2013.01); *G06T 2207/20084* (2013.01); *G06T 2207/20182* (2013.01); *G06T 2207/30021* (2013.01)

(58) Field of Classification Search
None
See application file for complete search history.

(56) References Cited

U.S. PATENT DOCUMENTS

| | | |
|---|---|---|
| 6,505,517 B1 | 1/2003 | Eryurek et al. |
| 9,557,154 B2 | 1/2017 | Tearney et al. |
| 9,633,277 B2 | 4/2017 | Feldman et al. |
| 10,094,649 B2 | 10/2018 | Bagherinia |
| 10,323,926 B2 | 6/2019 | Elmaanaoui |

(Continued)

FOREIGN PATENT DOCUMENTS

| | | | | |
|---|---|---|---|---|
| WO | WO-2014139018 A1 * | 9/2014 | ......... | A61B 1/00059 |
| WO | WO-2017143300 A1 * | 8/2017 | ........... | A61B 3/0025 |

OTHER PUBLICATIONS

Mela, C., et al., "Enhance Fluorescence Imaging and Remove Motion Artifacts by Combining Pixel Tracking, Interleaved Acquisition, and Temporal Gating", IEEE Photonics Journal, Feb. 2021, vol. 13, No. 1.

(Continued)

*Primary Examiner* — Mohammed Rachedine
(74) *Attorney, Agent, or Firm* — Canon U.S.A., Inc., IP Division

(57) ABSTRACT

Embodiments disclosed herein provide systems, methods and/or computer-readable media for automatically detecting and removing fluorescence artifacts from catheter-based multimodality OCT-NIRAF images. In one embodiment, a process of determining an automatic threshold value (automatic thresholding) is implemented by sorting characteristic parameter values of the NIRAF signal and finding a maximum perpendicular distance between a curve of the sorted values and a straight line from the highest to the lowest sorted value, combined with the use of unsupervised machine learning classification techniques to detect the frame's NIRAF values that correspond to signal artifacts. Once the signal artifacts are detected, the system can filter out the signal artifacts, correct the frames that had artifacts, and produce a more accurate multimodality image.

19 Claims, 13 Drawing Sheets

(56) References Cited

U.S. PATENT DOCUMENTS

| | | | |
|---|---|---|---|
| 10,387,445 | B2 | 8/2019 | Limonad et al. |
| 10,621,748 | B2 | 4/2020 | Kunio et al. |
| 11,120,548 | B2 * | 9/2021 | Wilson .................. G06T 5/20 |
| 2005/0216426 | A1 | 9/2005 | Weston et al. |
| 2007/0265521 | A1 | 11/2007 | Redel et al. |
| 2011/0119213 | A1 | 5/2011 | Elisseeff et al. |
| 2015/0062590 | A1 | 3/2015 | Bagherinia |
| 2016/0078309 | A1 | 3/2016 | Feldman et al. |
| 2016/0209049 | A1 | 7/2016 | Limberg et al. |
| 2016/0228097 | A1 | 8/2016 | Jaffer et al. |
| 2017/0309018 | A1 * | 10/2017 | Shalev ................. G06T 7/0012 |
| 2019/0099079 | A1 | 4/2019 | Yamada et al. |
| 2019/0374109 | A1 | 12/2019 | Wu et al. |
| 2020/0046283 | A1 | 2/2020 | Tearney et al. |
| 2020/0234080 | A1 | 7/2020 | Ciller Ruiz et al. |
| 2021/0110930 | A1 * | 4/2021 | Park ....................... G16H 50/20 |
| 2021/0174125 | A1 | 6/2021 | Zhang |
| 2023/0108071 | A1 * | 4/2023 | Jia ........................ A61B 5/0066 |
| | | | 600/425 |

OTHER PUBLICATIONS

Takeuchi, H., et al., "Simple and Efficient Method to Eliminate Spike Noise from Spectra Recorded on Charge-Coupled Device Detectors", Applied Spectroscopy, 1993, pp. 129-131, vol. 47, No. 1.

Melia, U., et al., "Removal of peak and spike noise in EEG signals based on the analytic signal magnitude," IEEE EMBS, 2012, pp. 3523-3526.

Sheybani, E. O., et al., "Removing spikes while preserving data and noise using wavelet filter banks," IEEE Aerospace Conference, 2010.

Wang, H., et al., "Ex vivo catheter-based imaging of coronary atherosclerosis using multimodality OCT and NIRAF excited at 633 nm," Biomedical Optics Express, Apr. 1, 2015, pp. 1363-1375, vol. 6, No. 4.

Ughi, G. J., et al., "Dual modality intravascular optical coherence tomography (OCT) and near-infrared fluorescence (NIRF) imaging: a fully automated algorithm for the distance-calibration of NIRF signal intensity for quantitative molecular imaging," Int. J. Cardiovascular. Imagine, 2014, pp. 259-268, vol. 31.

Mayer, J., et al., "Attenuation artifacts in light sheet fluorescence microscopy corrected by OPTiSPIM", Light: Science & Applications, 2018, vol. 7, No. 70.

Ester, M., et al., "A density-based algorithm for discovering clusters in large spatial databases with noise"; Proceedings of the Second International Conference on Knowledge Discovery and Data Mining (KDD-96); AAAI Press, pp. 226-231.

Athanasiou, L., et al., "Methodology for fully automated segmentation and plaque characterization in intracoronary optical coherence tomography images", Journal of Biomedical Optics, Feb. 2014, vol. 19, No. 2.

Athanasiou, L., et al., "Fully automated lumen segmentation of intracoronary optical coherence tomography images", SPIE Medical Imaging, 2017, vol. 19(2).

Bianchetti, G., et al., "Unsupervised clustering of multiparametric fluorescent images extends the spectrum of detectable cell membrane phases with sub-micrometric resolution", Biomedical Optics Express, Oct. 2020, pp. 5728-5744, vol. 11, No. 10.

Athanasiou, L., et al., "Intracoronary near infrared autofluorescence signal calibration".

* cited by examiner

ARTIFACT REMOVAL FROM MULTIMODALITY OCT IMAGES

CROSS-REFERENCE TO RELATED APPLICATIONS n/a

BACKGROUND INFORMATION

Field of Disclosure

The present disclosure relates to image processing. More particularly, the disclosure is directed to methods, systems, and computer-readable media configured for removal of image artifacts from catheter-based multimodality images using data sets in a machine learning operation.

Description of Related Art

In the medical field, coronary artery disease (CAD) is caused by the buildup of atherosclerotic tissue in the arterial wall, resulting in arterial stenosis. CAD is the cause of almost one third of all deaths in humans over 35 years old. Therefore, accurate detection of atherosclerosis is crucial for applying an effective treatment for patients affected by CAD disease. The evaluation of CAD can be complex, and many techniques and tools are used to assess the presence and severity of the condition. Coronary angiography uses X-ray imaging to "see" if there is a restriction in blood flow through a blood vessel. However, angiography provides little or no information regarding plaque composition and biological activity. Moreover, X-ray radiation is a concern for the safety of patients, and it cannot detect or identify the presence of early stage vascular disease.

Near infrared spectroscopy combined with intravascular ultrasound (NIRS-IVUS) use NIRS-IVUS catheters to detect and quantify the presence of lipid core in the atherosclerotic plaque and associate it with other features such as lumen size and plaque architecture. Ultrasound (US) imaging is a fast and non-invasive imaging modality which is widely used for real-time clinical imaging applications without concern about radiation hazard. Unfortunately, ultrasound often suffers from poor visual quality from various origins, such as speckle noises, blurring, multi-line acquisition (MLA), limited RF channels, small number of view angles for the case of plane wave imaging, etc.

An ideal coronary imaging system should provide a complete road map of atherosclerotic status throughout the coronary tree, delineate the architectural and compositional nature of each plaque, and determine lesion severity. Towards this purpose, newer imaging modalities have been developed either to visualize the plaque or provide molecular information or both. Multi-modality Optical Coherence Tomography (MMOCT) is an imaging method which integrates intravascular optical coherence tomography (OCT) with intravascular fluorescence spectroscopy in a single catheter to simultaneously obtain complementary and co-localized anatomical and molecular information from an arterial wall of a patient's blood vessel. Optical coherence tomography is an imaging modality that is analogous to ultrasound imaging, but uses light instead of sound. OCT offers significantly improved resolution and localization of structural features due to the much shorter wavelength of light as compared to ultrasound. Intravascular fluorescence is a catheter-based molecular imaging technique that uses near-infrared fluorescence to detect artery wall autofluorescence (NIRAF) or artery wall fluorescence generated by molecular agents injected intravenously (NIRF).

Examples of MMOCT technology are described by, for example, Wang, et al., "*Ex vivo catheter-based imaging of coronary atherosclerosis using multimodality OCT and NIRAF excited at 633 nm*," Biomedical Optics Express 6(4), 1363-1375 (2015); Ughi, et al., "*Dual modality intravascular optical coherence tomography (OCT) and near-infrared fluorescence (NIRF) imaging: a fully automated algorithm for the distance-calibration of NIRF signal intensity for quantitative molecular imaging*," Int. J. Cardiovascular. Imagine 31, 259-268 (2014); as well as patent-related publications including US 2016/0228097, US 2017/0209049, US 2019/0099079, and U.S. Pat. No. 9,557,154.

During intravascular imaging with an MMOCT system, a pullback unit translates the imaging core along a predetermined length (pullback length) of the lumen, while the catheter's imaging core rotates and scans the inner wall of the lumen with light of at least two different wavelengths. After pullback, OCT and fluorescence data are automatically displayed on a two-dimensional map of the vessel revealing the probability of the presence of plaque and/or other chemical information. The two dimensional map (also called a longitudinal view) shows the pullback position in millimeters on the x-axis and the circumferential position in degrees on the y-axis. For each pixel of a unit length and unit angle (e.g., 0.1 mm length and 1° angle), the amount of fluorescence is calculated from the spectral data collected and quantitatively coded on a color scale (or grayscale) in a range of values (e.g., 0 to 255) to represent shades of gray or percentages of the three primary colors (red, green, and blue). Whenever a pixel lacks sufficient data, for instance if there is a shadow or unexpected spike, the corresponding image pixel can be assigned a null value (e.g., black or white). The OCT and fluorescence data can also be displayed in a tomographic view to represent an axial view of the vessel (a view perpendicular to the longitudinal direction of the vessel) at a selected location. In a tomographic view, the fluorescence data is mapped and paired with corresponding OCT data, and the fluorescence is displayed as a ring or part of a ring around the OCT image.

Several sequential pairs of images comprising complementary and co-localized OCT and fluorescence signals are produced in this manner to represent vascular cross sections of a blood vessel. The presence of fluorescence in these images is usually associated with the presence of molecular information (e.g., intimal thickening, macrophages, angiogenesis, calcification, etc.) within the tissues of the blood vessel wall, which is not visible to OCT imaging. However, intravascular MMOCT images acquired with a single catheter are subject to fluorescence signal artifacts which are not associated with molecular structures or pathological status of the vessel. Fluorescence artifacts are anomalous data that may be produced by, but are not limited to, stent strut(s), guide wire(s), uneven image brightness due to variation in imaging angle, sheath reflections, an irregular shape of a vessel cross section where the catheter is touching the vessel wall, an irregular shape of the catheter sheath (ovalization), speckle noise, blurring due to signal cross-talk, etc. These fluorescence artifacts are anomalous data that can mislead the clinical user since she/he has to review all the fluorescence values and decide which signals are artifacts and which are not.

In the current state of the art, there are methods for detecting and reducing fluorescence artifacts in fluorescence systems that superimpose fluorescence and structural images to reduce errors due to motion (motion artifacts), spike noise (noise artifacts), and light attenuation (attenuation artifacts). Motion artifacts occur during intraoperative procedures where a fluorescent target (subject) may move, or an object may pass in front of the target, or the signal detector may move relative to the target. As a result, the positions of objects in motion are not at the same location in sequentially acquired frames. The inter-frame correspondence between pixels in subsequent frames changes due to motion, leading to artifacts when superimposing and subtracting frames. Noise artifacts (spike noise) occur, for example, when high-energy photons (e.g., environmental alpha or gamma rays), which are not related to molecular composition of the lumen, strike the signal detector. Spike noise (spikes) can also occur as a result of quick electronic transitions which alter the steady state of the system's electronic circuits (e.g., the digitizing electronics or signal detector). Signal attenuation (attenuation artifacts), e.g., due to energy absorption within the tissue sample can prevent excitation energy from reaching a fluorescence source or can prevent fluorescently emitted light from reaching the detector. Attenuation artifacts can be seen as shadows in an image, and can be detrimental to quantitative data analysis, or can even undermine the ability to clearly see certain structures in the image.

Solutions for detecting and reducing fluorescence motion artifacts include, for example, C. Mela et al., "Enhance Fluorescence Imaging and Remove Motion Artifacts by Combining Pixel Tracking, Interleaved Acquisition, and Temporal Gating," *IEEE Photonics Journal*, 2021. This approach proposes to enhance fluorescence imaging by removing motion artifacts from images where the fluorescence is superimposed over some other imaging modality. Removing motion artifacts is done using pulsatile information and gating to separate true signals from artifacts. The method focuses only on motion artifacts, and cannot be applied to MMOCT intravascular imaging where the OCT and NIRAF data are simultaneously acquired, but their values and spikes can vary independently. More specifically, although OCT and NIRAF are acquired simultaneously, the NIRAF signal is not superimposed with the anatomical OCT image, and is not associated with a specific tissue phenotype visible in the OCT image. Moreover, the NIRAF signal spikes are artifacts created randomly and can occur anywhere within the pullback.

Solutions for detecting and reducing spikes corresponding to fluorescence noise artifacts include, for example, H. Takeuchi et al., "*Simple and Efficient Method to Eliminate Spike Noise from Spectra Recorded on Charge-Coupled Device Detectors,*" *Applied Spectroscopy*, 1993; U. Melia et al., "*Removal of peak and spike noise in EEG signals based on the analytic signal magnitude*," IEEE EMBS, 2012; E. Sheybani et al., "*Removing spikes while preserving data and noise using wavelet filter banks*," IEEE Aerospace Conference, 2010. The method to remove spikes in charge-coupled device detectors disclosed by Takeuchi is based on counting the spectra of the signal and measuring the mean signal values. This method works well when the signal is periodic. The method to remove spikes in electroencephalogram signals disclosed by Melia uses an analytic signal envelope, filtered with a low-pass filter. This method too works well when signal is periodic. The method to remove spikes using a multi-resolution filtering approach disclosed by Sheybani is based on Haar wavelets. It decomposes the signal to its coarse and detailed components, and adaptively filters out the undesired components. This method can be used for signals that have spikes which do not vary in value. The foregoing methods cannot be applied to MMOCT intravascular auto-fluorescence signals since both OCT and NIRAF values and spikes vary independently.

U.S. Pat. No. 6,505,517 B1 entitled "High accuracy signal processing for magnetic flowmeter," by Eryurek et al., describes a device for measuring the flow of a conductive fluid. The detected signal was acquired by a sensor and was post-processed for signal spike removal: the signal values were compared to the average signal. Here too, the method works when signal values are uniform and signal spikes are high. The method cannot be applied in MMOCT intravascular auto-fluorescence signals since both their values and spikes vary.

With regard to attenuation artifacts, Mayer et al., discloses "*Attenuation artifacts in light sheet fluorescence microscopy corrected by OPTiSPIM*" Light: Science & Applications (2018) 7:70. The method proposes a hybrid instrument (OPTiSPIM) that can quantify attenuation artifacts and use the information to correct the shadow artifacts. The hybrid instrument allows generating both high-resolution 3D fluorescence data and 3D maps of the attenuating properties of the sample. The 3D map of attenuation is used to computationally correct the shadow artifacts. The method is data intensive and applies to fluorescence microscopy without consideration for a secondary modality having signals that vary independently.

In summary, although a fluorescence signal acquired by MMOCT imaging can provide molecular information (e.g., macrophages, angiogenesis etc.), the fluorescence signal can often be associated with catheter and/or lumen artifacts in the form of signal spikes. This phenomenon might mislead the clinical users which have to decide if the signal is an artifact or not by examining the presence of the fluorescence signal in the preceding and succeeding frames, and correlating those frames with plaque anatomical information. To avoid this time consuming process and to minimize the user's post processing efforts, it would be advantageous to provide a system and method which automatically detects and corrects the fluorescence signal artifacts in catheter-based multimodality (OCT-NIRAF) images.

SUMMARY OF EXEMPLARY EMBODIMENTS

According to the present disclosure, embodiments disclosed herein provide systems, methods, and/or computer-readable media for automatically detecting and removing fluorescence artifacts (anomalous data) from catheter-based multimodality OCT-NIRAF images. According to one embodiment, a process (method) to fully automatically detect and correct NIRAF artifacts in a multimodality OCT-NIRAF image is divided into two parts. In Part I, the process is configured to: Import one-dimensional (1D) NIRAF values for each cross sectional frame (B-scan) of a NIRAF-OCT image acquired by a catheter-based multimodality imaging system; create a NIRAF standard deviation (std) signal (NSTD) by calculating the NIRAF std in each cross sectional frame (B-scan frame); and calculate the absolute difference between adjacent elements of std (ABS_NSTD). Sort the ABS_NSTD and calculate a line L from the first to last (lowest to highest) point of the sorted ABS_NSTD, and calculate the highest perpendicular distance from sorted ABS_NSTD points to the line L. Define as a threshold (Thr_std) the std value that corresponds to the point of the highest perpendicular distance, and define as possible NIRAF error frames the points, FP, of ABS_NSTD that are greater than Thr_std. In Part II, for each frame FP define a set of points as the NIRAF values of FP−1, FP and FP+1 and apply unsupervised two class clustering using the density-based clustering non-parametric algorithm (DBSCAN) to detect the values that correspond to NIRAF noise and replace the NIRAF noise values with the lowest corresponding NIRAF value of one of the other two frames.

According to another embodiment, a catheter-based multimodality system comprises: a catheter configured to acquire a multimodality image of a biological lumen, wherein the multimodality image of the biological lumen includes optical coherence tomography (OCT) data and fluorescence data; and an image processing device having a memory and a processor. The processor is operatively connected to the catheter and configured to: receive a set of B-scan frames of the OCT and fluorescence data of the multimodality image acquired by the catheter; compare fluorescence data values of each B-scan frame to a threshold value; for each B-scan frame detected to have a fluorescence data value equal to or higher than the threshold value, set the B-scan frame as a potential error frame; acquire a fluorescence data value for a preceding B-scan frame and a fluorescence data value for a subsequent B-scan frame relative to the B-scan frame set as the potential error frame; input the fluorescence data value of the potential error frame, the fluorescence data value of the preceding B-scan frame, and the fluorescence data value of the subsequent B-scan frame into a two-class classifier; and determine, using the two-class classifier, whether the fluorescence data value of the potential error frame is a fluorescence artifact or not, wherein the two-class classifier includes a machine learning classification algorithm trained to determine whether the fluorescence data value of the potential error frame corresponds to one or more known fluorescence artifacts with which the algorithm has been trained.

According to one or more embodiments of the system, the processor is further configured to: calculate a standard deviation of the fluorescence data values of each B-scan frame using A-line scans contained in each B-scan frame of the multimodality image; sort the standard deviation of the fluorescence data values from lowest to highest along a standard deviation curve for each B-scan frame of the multimodality image; calculate a straight line L from the lowest to the highest point of the standard deviation curve; calculate a perpendicular distance from the straight line L to each point along the standard deviation curve; and define, as the threshold value, the value along the standard deviation curve that corresponds to the longest perpendicular distance from the straight line L to the standard deviation curve.

In another embodiment of the system, the processor automatically defines the threshold value for each B-scan frame based on the longest perpendicular distance from the straight line L to the standard deviation curve, and defines as the potential error frame each B-scan frame that has one or more points of the standard deviation curve equal to or greater than the threshold value.

In a further embodiment of the system, the processor is configured to delete the B-scan frame defined as the potential error frame and replace the fluorescence data value of the deleted frame with the lower of the fluorescence data value of the preceding B-scan frame or the fluorescence data value of the subsequent B-scan frame.

The present disclosure proposes a process of determining an automatic threshold value (automatic thresholding) implemented by sorting the std values of a NIRAF signal and finding a maximum perpendicular distance, and correcting NIRAF artifacts with the use of unsupervised machine learning classification techniques to detect the frame's NIRAF values that correspond to signal artifacts.

These and other objects, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

Throughout the figures, the same reference numerals and characters, unless otherwise stated, are used to denote like features, elements, components or portions of the illustrated embodiments, where.

DETAILED DESCRIPTION OF EXEMPLARY EMBODIMENTS

Figure 1:
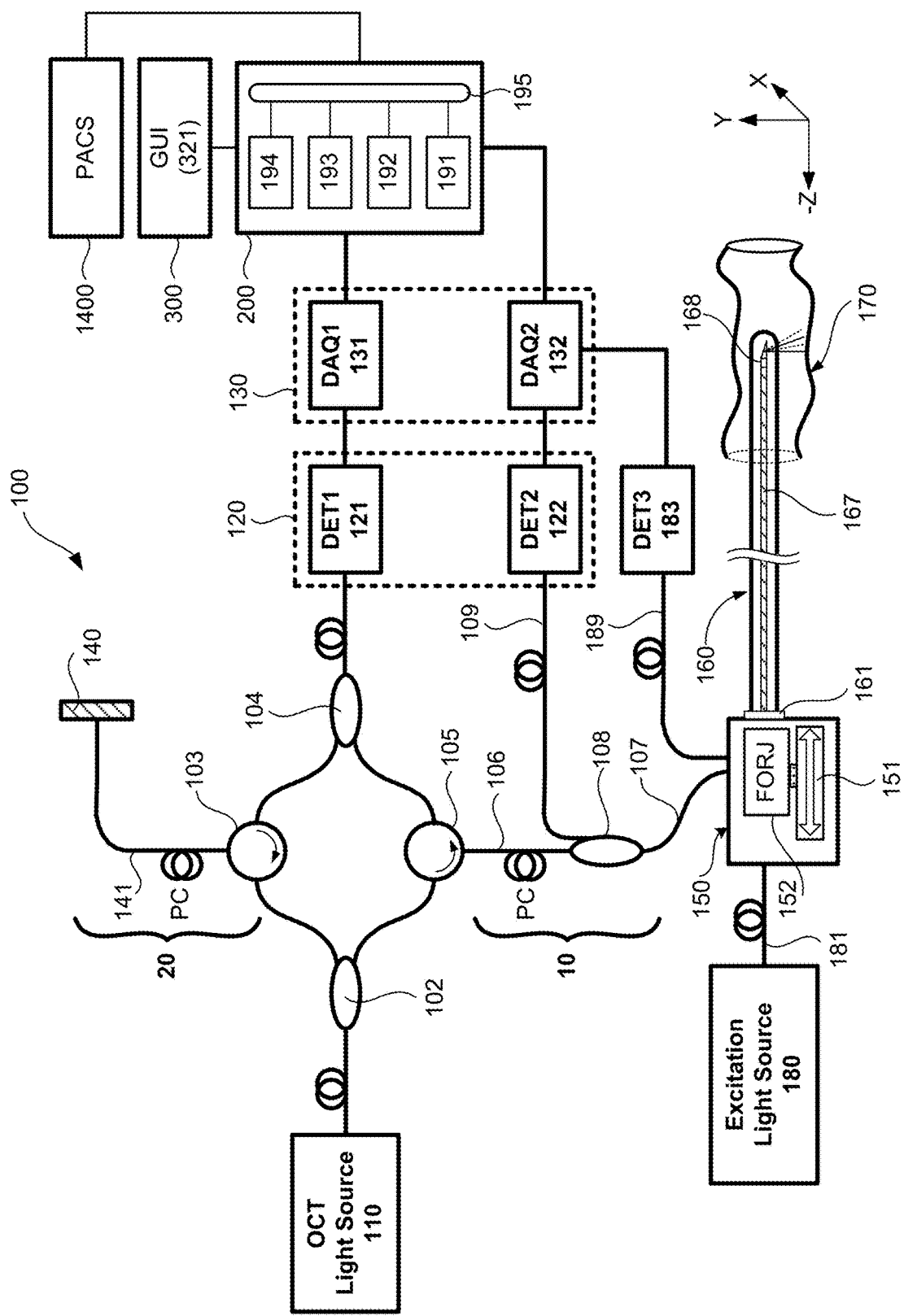
FIG. 1 illustrates an exemplary catheter-based multimodality imaging system 100 including an interferometric OCT modality and a fluorescence modality.

Before the various embodiments are described in further detail, it is to be understood that the present disclosure is not limited to any particular embodiment. It is also to be understood that the terminology used herein is for the purpose of describing exemplary embodiments only, and is not intended to be limiting.

In addition, while the subject disclosure is described in detail with reference to the enclosed figures, it is done so in connection with illustrative exemplary embodiments. It is intended that changes and modifications can be made to the described exemplary embodiments without departing from the true scope of the subject disclosure as defined by the appended claims. Although the drawings represent some possible configurations and approaches, the drawings are not necessarily to scale and certain features may be exaggerated, removed, or partially sectioned to better illustrate and explain certain aspects of the present disclosure. The descriptions set forth herein are not intended to be exhaustive or otherwise limit or restrict the claims to the precise forms and configurations shown in the drawings and disclosed in the following detailed description.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached", "coupled" or the like to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown in one embodiment can apply to other embodiments. It will also be appreciated by those of skill in the art that references to a structure or feature that is disposed "adjacent" to another feature may have portions that overlap or underlie the adjacent feature.

The terms first, second, third, etc. may be used herein to describe various elements, components, regions, parts and/or sections. It should be understood that these elements, components, regions, parts and/or sections are not limited by these terms of designation. These terms of designation have been used only to distinguish one element, component, region, part, or section from another region, part, or section. Thus, a first element, component, region, part, or section discussed below could be termed a second element, component, region, part, or section merely for purposes of distinction but without limitation and without departing from structural or functional meaning.

As used herein, the singular forms "a", "an", and "the" are intended to include the plural forms as well, unless the context clearly indicates otherwise. It should be further understood that the terms "includes" and/or "including", "comprises" and/or "comprising", "consists" and/or "consisting" when used in the present specification and claims, specify the presence of stated features, integers, steps, operations, elements, and/or components, but do not preclude the presence or addition of one or more other features, integers, steps, operations, elements, components, and/or groups thereof not explicitly stated. Further, in the present disclosure, the transitional phrase "consisting of" excludes any element, step, or component not specified in the claim. It is further noted that some claims or some features of a claim may be drafted to exclude any optional element; such claims may use exclusive terminology as "solely," "only"

and the like in connection with the recitation of claim elements, or it may use of a "negative" limitation.

The term "about" or "approximately" as used herein means, for example, within 10%, within 5%, or less. In some embodiments, the term "about" may mean within measurement error. In this regard, where described or claimed, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range, if recited herein, is intended to be inclusive of end values and includes all sub-ranges subsumed therein, unless specifically stated otherwise. As used herein, the term "substantially" is meant to allow for deviations from the descriptor that do not negatively affect the intended purpose. For example, deviations that are from limitations in measurements, differences within manufacture tolerance, or variations of less than 5% can be considered within the scope of substantially the same. The specified descriptor can be an absolute value (e.g. substantially spherical, substantially perpendicular, substantially concentric, etc.) or a relative term (e.g. substantially similar, substantially the same, etc.).

Unless specifically stated otherwise, as apparent from the following disclosure, it is understood that, throughout the disclosure, discussions using terms such as "processing," "computing," "calculating," "determining," "displaying," or the like, refer to the action and processes of a computer system, or similar electronic computing device, or data processing device that manipulates and transforms data represented as physical (electronic) quantities within the computer system's registers and memories into other data similarly represented as physical quantities within the computer system memories or registers or other such information storage, transmission or display devices. Computer or electronic operations described in the specification or recited in the appended claims may generally be performed in any order, unless context dictates otherwise. Also, although various operational flow diagrams are presented in a sequence(s), it should be understood that the various operations may be performed in other orders than those which are illustrated or claimed, or operations may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "in response to", "related to," "based on", or other like past-tense adjectives are generally not intended to exclude such variants, unless context dictates otherwise.

The present disclosure generally relates to medical devices, and it exemplifies embodiments of an optical probe which may be applicable to a spectroscopic apparatus (e.g., an endoscope), an optical coherence tomographic (OCT) apparatus, or a combination of such apparatuses (e.g., a multi-modality optical probe). The embodiments of the optical probe and portions thereof are described in terms of their state in a three-dimensional space. As used herein, the term "position" refers to the location of an object or a portion of an object in a three-dimensional space (e.g., three degrees of translational freedom along Cartesian X, Y, Z coordinates); the term "orientation" refers to the rotational placement of an object or a portion of an object (three degrees of rotational freedom—e.g., roll, pitch, and yaw); the term "posture" refers to the position of an object or a portion of an object in at least one degree of translational freedom and to the orientation of that object or portion of object in at least one degree of rotational freedom (up to six total degrees of freedom); the term "shape" refers to a set of posture, positions, and/or orientations measured along the elongated body of the object.

As it is known in the field of medical devices, the terms "proximal" and "distal" are used with reference to the manipulation of an end of an instrument extending from the user to a surgical or diagnostic site. In this regard, the term "proximal" refers to the portion (e.g., a handle) of the instrument closer to the user, and the term "distal" refers to the portion (tip) of the instrument further away from the user and closer to a surgical or diagnostic site. It will be further appreciated that, for convenience and clarity, spatial terms such as "vertical", "horizontal", "up", and "down" may be used herein with respect to the drawings. However, surgical instruments are used in many orientations and positions, and these terms are not intended to be limiting and/or absolute.

As used herein the term "catheter" generally refers to a flexible and thin tubular instrument made of medical grade material designed to be inserted through a narrow opening into a bodily lumen (e.g., a vessel) to perform a broad range of medical functions. The more specific term "optical catheter" refers to a medical instrument comprising an elongated bundle of one or more flexible light conducting fibers disposed inside a protective sheath made of medical grade material and having an optical imaging function. A particular example of an optical catheter is fiber optic catheter which comprises a sheath, a coil, a protector and an optical probe. In some applications a catheter may include a "guide catheter" which functions similarly to a sheath.

As used herein the term "endoscope" refers to a rigid or flexible medical instrument which uses light guided by an optical probe to look inside a body cavity or organ. A medical procedure, in which an endoscope is inserted through a natural opening, is called an endoscopy. Specialized endoscopes are generally named for how or where the endoscope is intended to be used, such as the bronchoscope (mouth), sigmoidoscope (rectum), cystoscope (bladder), nephroscope (kidney), bronchoscope (bronchi), laryngoscope (larynx), otoscope (ear), arthroscope (joint), laparoscope (abdomen), and gastrointestinal endoscopes.

In the present disclosure, the terms "optical fiber", "fiber optic", or simply "fiber" refers to an elongated, flexible, light conducting conduit capable of conducting light from one end to another end due to the effect known as total internal reflection. The terms "light guiding component" or "waveguide" may also refer to, or may have the functionality of, an optical fiber. The term "fiber" may refer to one or more light conducting fibers. An optical fiber has a generally transparent, homogenous core, through which the light is guided, and the core is surrounded by a homogenous cladding. The refraction index of the core is larger than the refraction index of the cladding. Depending on design choice some fibers can have multiple claddings surrounding the core.

[here: paragraphs 0047-0063 describe the OCT system, which is similar to MOI 26975]

<Multi-Modality OCT (MMOCT) Imaging System>

According to one embodiment, a multimodality OCT-NIRAF imaging system including a system console and a multimodality catheter are configured to acquire co-registered OCT-NIRAF images from a lumen sample such as a cardiovascular vessel. In one embodiment, OCT images can be acquired with a swept source laser with a center wavelength of 1310 nanometers (nm) and a bandwidth of about 127 nm. NIRAF images can be acquired by exciting the lumen sample at 633 nm and detecting fluorescence emission in a wavelength range between 660 nm and 740 nm. OCT irradiation light and NIRAF excitation light are delivered to the vessel via a single double-clad fiber (DCF) arranged inside the catheter. The catheter is connected to the imaging system through a patient interface unit (PIU) which provides a beam combiner (to direct the light) and a pullback unit that effectuates mechanical helical scanning. The system acquires synchronized and co-registered OCT and NIRAF data at a rate of at least 200 frames per second (fps) with a pullback speed of 10-40 mm/s. Each OCT-NIRAF image frame contains about 500 A-lines.

FIG. 1 illustrates an exemplary multimodality OCT (MMOCT) imaging system 100 including an interferometric OCT modality and a fluorescence spectroscopy modality. The system 100 may be used for endovascular imaging and could also be adapted with a balloon catheter for esophageal imaging or imaging of other similar bodily lumens. As depicted in FIG. 1, the OCT modality is comprised of an interferometer (e.g. a Michaelson interferometer) having a sample arm 10 and a reference arm 20, an OCT light source 110, a detector unit 120, a data acquisition (DAQ) unit 130, and a computer 200. The computer 200 is connected to a display device 300 and an external system such as a picture archiving and communication system (PACS) 1400. The sample arm 10 includes a patient interface unit (PIU) 150, and a fiber-based catheter 160. The fluorescence modality is comprised of an excitation light source 180, the catheter 160, a photodetector 183, the data acquisition (DAQ) unit 130, and the computer 200. In the fluorescence modality, the light source 180 is connected to the PIU 150 via an optical fiber 181.

The PIU 150 includes a non-illustrated beam combiner, a fiber optic rotary joint 152 and a pullback unit 151 (e.g., a precision linear stage). In one embodiment, the system 100 uses a swept-source laser (1310 nm+/−50 nm) as the OCT light source 110 for the OCT modality, and a Helium-Neon (He:Ne) laser with a center wavelength of about 633 nm as the excitation light source 180 for the fluorescence modality. The catheter 160 includes an imaging core comprised of a double clad fiber (DCF) 167 with a distal optics assembly 168. The distal optics assembly may include a polished ball lens at the tip of the DCF 167 for side-view imaging. The distal optics 168 may alternatively include a graded index (GRIN) lens and a refractive element (grating) attached at the tip of the DCF 167. At the proximal end, the catheter 160 is connected to the PIU 150 via a catheter connector 161.

The imaging system 100 is configured to simultaneously acquire OCT and fluorescence images from a sample 170 which may include a biological lumen, such as a vessel. To that end, light or other electromagnetic radiation (radiation of first wavelength) from the OCT light source 110 is guided through the sample arm 10 to the sample 170, and through the reference arm 20 to a reflector 140, the light travels back along the respective optical paths to thereby generate OCT interference patterns. Specifically, light from the light source 110 is split (e.g., 50/50) by a splitter 102 (fiber splitter or beam splitter) into a sample beam and a reference beam which are respectively conveyed to the sample arm 10 and the reference arm 20 via respective optical fibers. In the sample arm 10, the sample beam enters a circulator 105, passes to a fiber coupler 108 via a single-mode (SM) fiber 106, and the sample beam is delivered to the PIU 150 via a double clad fiber 107. The catheter 160 is connected to the PIU 150, and the PIU 150 is in turn connected to computer 200 (via non-illustrated electronic connections). Under control of the computer 200, the PIU 150 controls rotation of the imaging core of catheter 160 to irradiate the sample 170 with the sample beam in a scanning manner. Light of the sample beam reflected and/or scattered by the sample 170 is collected by the distal optics 168 (optical probe) arranged at the distal end of the catheter 160, and the collected light is transmitted back through the double clad fiber 167 to the PIU 150. From the PIU the collected light (sample beam) advances to fiber coupler 108 through the fiber 107. The fiber coupler 108 forwards part of the returned light towards the circulator 105 via the SM fiber 106; and the circulator 105 guides that part of the returned light to the combiner 104. In addition, the fiber coupler 108 couples another part of the returned light to the second detector 122 via a multi-mode fiber 109.

In the reference arm 20, light of the reference beam enters a circulator 103 and is delivered to the reflector 140 via an optical fiber 141. In a case of Time Domain OCT (TD-OCT) imaging, the reflector 140 may be implemented by a scanning mirror and an optical delay line (ODL). In a case of Frequency Domain OCT (FD-OCT) imaging, the reflector 140 may be implemented as a stationary mirror. Light of the reference beam reflected from the reflector 140 passes through the circulator 103, and is also guided to the combiner 104. In this manner, the sample and reference beams are combined at the beam combiner 104 and then detected by detector 121 to generate interference signals according to known OCT principles.

The detector 121 (a first detector) is implemented as an array of photodiodes, a photo multiplier tube (PMT), a multi-array of cameras or other similar interference pattern detecting device. In at least one embodiment, the detector 121 can be a balanced photodetector. The signals output from the first detector 121 are pre-processed (digitized) by data acquisition electronics (DAQ1) 131, and transferred to the computer 200. The computer 200 performs signal processing to generate OCT images in a known manner. The interference patterns are generated only when the optical path length of the sample arm 20 matches the optical path length of the reference arm 20 within the coherence length of the OCT light source 110. Polarization sensitive OCT measurements can be taken by using polarization maintaining (PM) optical fibers or through in-line paddle-based polarization controllers (PC).

In the fluorescence modality, the excitation light source 180 emits an excitation light with a center wavelength of 633 nm (radiation of second wavelength). In other embodiments, the excitation light can have different center wavelength (e.g., 485 nm) depending on the desired application. The excitation light is guided by a fiber 181, the FORJ 152, the double clad fiber 167, and the distal optics 168 to irradiate the sample 170. In response to being irradiated by the excitation light, the sample 170 emits a near infrared autofluorescence (NIRAF) signal or a near infrared fluorescence (NIRF) signal with a broadband wavelength in a range higher than the excitation wavelength (radiation of third wavelength, e.g., 633 to 800 nm) according to known fluorescence emission principles. As used herein, fluorescence is an optical phenomenon in which the molecular absorption of energy in the form of photons triggers an immediate emission of fluorescent photons with a wavelength longer than that of the excitation light.

In one embodiment, the fluorescence light generated by the sample 170 may include auto-fluorescence, which is the endogenous fluorescence light generated without application of a dye or agent. In other embodiments, the fluorescence light generated by the sample 170 may include fluorescence light generated by exogenous fluorescence of a dye or a contrast agent added to the sample (e.g., during lumen clearance). The auto-fluorescence (or fluorescence) light is collected by the distal optics 168 of the catheter 160 and delivered back to the PIU 150, where the FORJ 152 and a non-illustrated beam combiner/splitter conveys the fluorescence signal to a photodetector 183 via an optical fiber 189. The signal (fluorescence intensity signal) output from detector 183 is digitized by data acquisition (DAQ2) 132 and transmitted to computer 200 for image processing. Preferably, the OCT interference patterns of the OCT modality, and the fluorescence signal of fluorescence modality are delivered to the computer 100 simultaneously.

The second detector 122 detects part of the sample beam transmitted from the fiber coupler 108 via the multi-mode fiber 109. The second detector 122 outputs an analog signal corresponding to an intensity of the backscattered light (backscattered signal). The backscattered signal returned from sample 170 and detected by the second detector 122 is not an interference signal. The signal output from detector 122 is converted to digital data with data acquisition electronics (DAQ2) 132. Notably, as later explained more in detail, the digital signal corresponding to the intensity of the backscattered light can used to calculate a distance and/or an angle at which the light from the catheter is incident on the sample 170. The intensity of the backscattered light may also be used as a trigger signal for starting and/or ending pullback and image recording operations. Therefore, the signal output from detector 122, and converted to digital data by data acquisition electronics (DAQ2) 132 can be used directly as a trigger signal or it can be transferred to the computer 200 for control processing.

As shown in FIG. 1, the computer 200 includes a central processing unit (CPU) 191, a storage memory (ROM/RAM) 192, a user input/output (I/O) interface 193, and a system interface 194. The various functional components of the computer 200 are operatively connected and communicate with each other via physical and logical data lines (a DATA BUS) 195. Storage memory 192 includes one or more computer-readable and/or writable media, and may include, for example, a magnetic disc (e.g., a hard disk drive HHD or solid stated drive SDS), an optical disc (e.g., a DVD®, a Blu-ray®, or the like), a magneto-optical disk, semiconductor memory (e.g., a non-volatile memory card, Flash® memory, a solid state drive, SRAM, DRAM), an EPROM, an EEPROM, etc. Storage memory 192 may store computer-readable data and/or computer-executable instructions including Operating System (OS) programs, and control and processing program code.

The user interface 193 provides a communication interface (electronic connections) to input/output (I/O) devices, which may include a keyboard, a display device 300 (e.g., LCD or OLED display screen), a mouse, a printing device, a touch screen, a light pen, an external optical storage device, a scanner, a microphone, a camera, a drive, communication cable and a network (either wired or wireless). The system interface 194 also provides an electronic interface (electronic connection circuits) for one or more of the light source 110 of OCT modality, excitation light source 180 of fluorescence modality, the one or more detector(s) 121 of the OCT modality, the detector 183 of the fluorescence modality, and the data acquisition (DAQ2) circuit 132, as well as the, and the patient unit interface (PIU) 150. The system interface 194 may include programmable logic for use with a programmable logic device (PDL), such as a Field Programmable Gate Array (FPGA) or other PLD, discrete components, integrated circuitry (e.g., an Application Specific Integrated Circuit (ASIC)), or any other components including any combination thereof. The function of the user interface 193 and of the system interface 194 may be realized at least in part by computer executable instructions (e.g., one or more programs) recorded in storage memory 192 and executed by CPU 191, or programs executed in a remote location via a network (e.g. cloud computing). Moreover, the computer 200 may comprise one or more additional devices, for example, components such as a communications or network interface for communicating with other medical devices, such as displays, printers, PACS 1400, etc. The functional operation of the imaging system 100 illustrated in FIG. 1 is implemented by the CPU 191 of computer 200 executing executable instructions or programs stored in the ROM/RAM of storage memory 192.

Figure 2A:
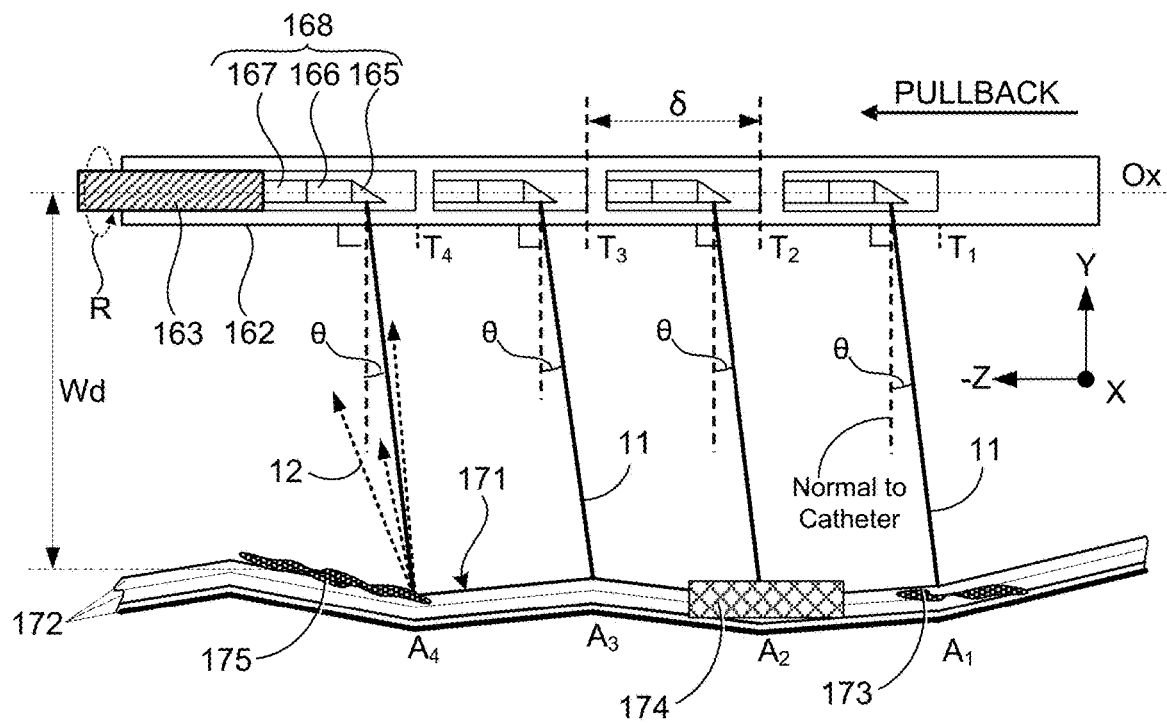
FIG. 2A and FIG. 2B respectively illustrate longitudinal and axial views of a pullback operation of the catheter-based multimodality imaging system 100.
Figure 2B:
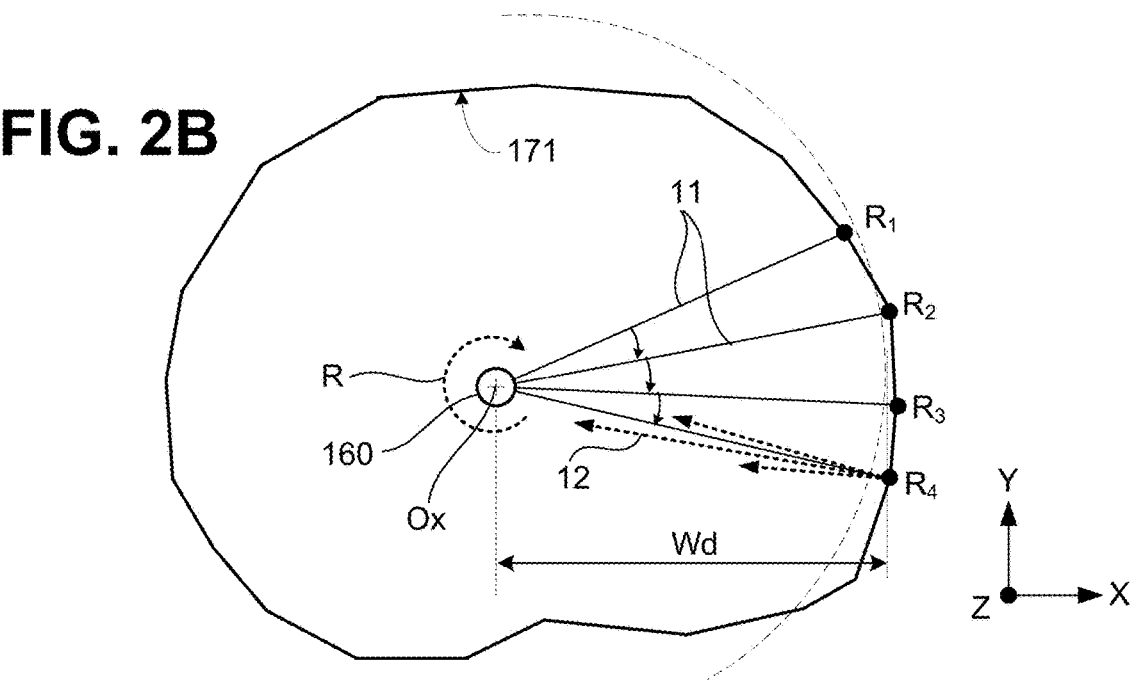

FIG. 2A and FIG. 2B respectively illustrate exemplary longitudinal and axial views of distal optics 168 (optical probe) of the catheter 160 at sequential positions during a pullback operation. As shown in FIG. 2A, the distal optics 168 (or optical probe) includes the double clad fiber (DCF) 167, a lens 166 such as a GRIN lens or a ball lens (focusing component), and a reflecting or diffracting surface 165 (beam directing component). The catheter 160 is connected at the proximal end thereof to the PIU 150 via the connector 161 (as shown in FIG. 1). A torque coil 163 delivers rotational torque from a non-illustrated rotational motor located in the PIU 150 to the distal end of the catheter 160. At the distal end of the catheter 160, the reflecting surface or diffracting surface 165 (e.g., a mirror, a prism, or a grating) deflects the illumination light (illumination light beam 11) radially toward the sample 170 (wall of a lumen cavity) which is located at a working distance (Wd). As shown in FIG. 2A, the imaging probe 168 is configured for side-view imaging, where the illumination light beam 11 is emitted from the catheter at an angle theta with respect to the catheter axis Ox, and then is incident on the sample surface 171 along a line transverse to the catheter's axis Ox. Here, since OCT data and fluorescence data are obtained simultaneously by the common probe 168, illumination light beam 11 refers to light incident on the sample 170 (regardless of whether the beam 11 is light emitted by OCT light source 110 and/or light emitted from excitation light source 180).

While the illumination beam 11 (including OCT light and excitation light) illuminates a bodily lumen (e.g., a vessel wall), the catheter 160 rotates or oscillates (as indicated by arrow R) about the catheter axis Ox, while the optical probe is pulled back inside a protective sheath 162 which remains stationary. In this manner, the catheter 160 can continuously scan the sample 170 with the illumination beam 11 in a rotary fashion (as shown in FIG. 2B) through successive radial positions. The distal optics or probe 168 collects a returning light 12 (sample beam) which includes backscattered light and fluorescence light from sample 170. The returning light 12 carries information about an inner surface 171 (e.g., a vessel wall). An interference signal (an interference pattern) is obtained by combining a reference light beam (not shown) and the backscattered OCT light collected from the sample 170. At the same time, a fluorescence signal is collected, detected, and stored. As explained above with reference to FIG. 1, the interference OCT signal and fluorescence signal are converted into an electronic signal, which is digitized, stored, and/or processed to analyze the status of the sample being examined. The combination of backscattered light from the sample beam 12 and reference light from the reference beam (not shown) results in the interference signal, only if light from both the sample and reference beams have traveled substantially the same optical distance (where "substantially the same optical distance" indicates a difference of less than or equal to the coherence length of the light source).

Regions of the sample 170 that reflect more light will create stronger interference signals than regions that reflect less light. Any light that is outside the coherence length will not contribute to the interference signal. The intensity profile of the backscattered light, which is also referred to as an A-scan or an A-line, contains information about the spatial dimensions and location of characteristic features. Information may include, for example, depth tissue layers 172, location of calcified plaque 173 formed on the wall or within the layers of the lumen (sample surface) 171, and location and size of a stent 174. An OCT image (i.e., a cross-sectional tomogram generally referred to as a B-scan) may be formed by combining multiple A-scans acquired at different positions along the length of the lumen wall.

The diagram of FIG. 2A depicts catheter positions (a plurality of longitudinal locations T1, T2, T3, T4) at corresponding timings t1, t2, t3, t4, etc., along the pullback path, where a different A-scan (A1, A2, A3, A4 . . . ) is collected while scanning the sample 170 with the illumination light beam 11 at a fixed angle θ. Delta (δ) is the distance the catheter travels during pullback in between successive one revolution measurements (or A-scans). In the exemplary pullback of FIG. 2A, a first A-line scan (A1) at pullback location T1 can obtain information about the tissue layers and artifact formation (neointima formation), a second A-line scan (A2) at location T2 can obtain information about stent 174 (e.g., stent thrombus, stent apposition, stent malapposition, stent edge dissection, stent-strut coverage or detection), a third A-line scan (A3) at location T3 can contain information from only tissue layers of sample 170, and a fourth A-line scan (A4) at location T4 can contain information about plaque 175 (e.g. plaque type, plaque depth) built up on the surface of sample 170. The information obtained from the A-line scans can be correlated with information acquired from the fluorescence signal to improve diagnostic results.

FIG. 2B illustrates an axial view (X-Y plane view) of the distal end of catheter 160 with exemplary illumination light beam 11 incident on the sample 170 (e.g., blood vessel wall) at a plurality of rotational locations R1, R2, R3, R4 along a helical path. Measurements at each rotational location R1-R4 are performed while scanning the sample 170 with light beam 11 at the fixed (same) angle θ. Each of locations R1, R2, R3, and R4 represents a different rotational location on the lumen inner surface at which a measurement is made while the catheter 160 rotates. Therefore, it should be appreciated that a resulting signal detected at each rotational location can have different characteristics depending on, for example, the distance (Wd) between the catheter 160 and the inner surface 171 (lumen edge) of the sample 170. In this regard, it is known that tortuosity of the lumen sample 170 can cause the catheter to bend and obtain an image while touching the lumen edge. In this case, the acquired signal can be a source of image artifacts that can cause misinterpretation of image data. For example, if the catheter 160 bends such the catheter axis is no longer at the center of the lumen, and an image is acquired when the catheter is in contact with a stent 174 or a plaque 175 (shown in FIG. 2A), the collected signal can include an erroneous fluorescence intensity signal (e.g., a false positive signal). Therefore, it is important to provide an option to the user to confirm in real time the true characteristic of such signal.

The pullback movement in the −z direction combined with rotational movement R of the catheter 160 enables A-lines to be generated multiple times by helically scanning the inner surface 171 of the sample 170. Combining a plurality of A-line scans is possible to produce a 2D image (a cross section) of the sample 170. Each 2D image of a vessel cross section, for example, may be formed by combining approximately 500 lines or more, corresponding to a full circumferential (360 degree) scan by the catheter 160. This full circumferential scan may be sometimes referred to as a "frame". Three-dimensional (3D) imaging of the inner surface 171 can be achieved by combining plural 2D image frames obtained during the longitudinal translational motion of the pullback operation while the catheter is rotating. The resulting catheter scan is a helical path of successive A-lines which are collected into a 2D image frame which can, in turn, be combined to form a full 3D dataset (3D volume) of the inner surface 171 of the sample 170. Data collected from successive A-line scans is processed (e.g., by fast Fourier transformation and other known algorithms) to generate OCT images of the sample 170 in a known manner. At the same time, the fluorescence signal is also collected, processed, stored/displayed, and analyzed in correspondence with the OCT images.

Catheter-based MMOCT imaging can be performed for various reasons, for example, during coronary catheterization. In this case, OCT imaging can provide structural information of the vessel parameters (e.g., vessel diameter, lumen edge, clearance status, etc.), and fluorescence imaging can compliment the structural information of the vessel with molecular information (plaque buildup and composition) indicative of the pathological structure obtained from the fluorescence signal. However, due to signal artifacts, the fluorescence signal does not always correspond to the molecular structure of the vessel.

Figure 3:
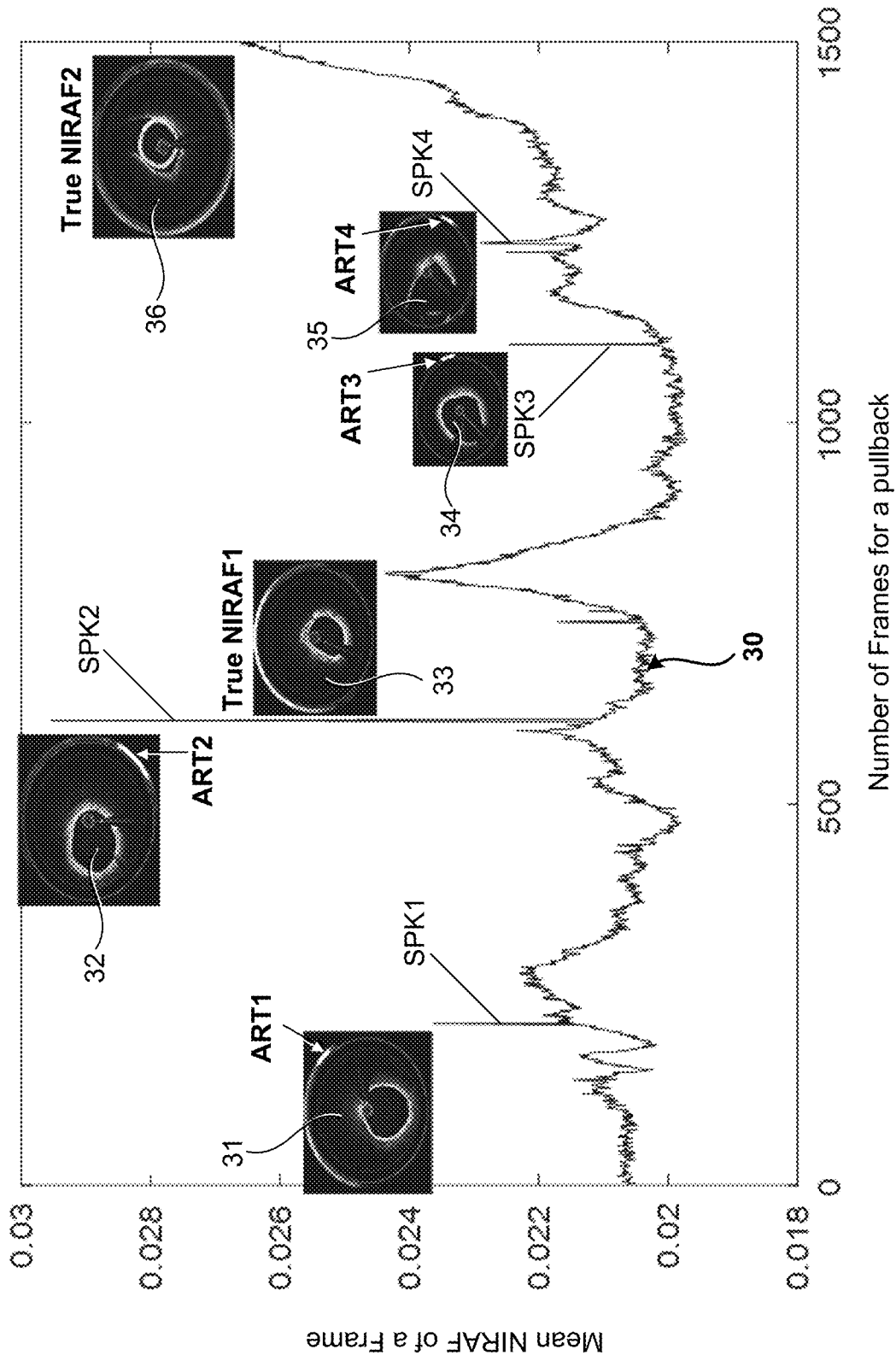
FIG. 3 illustrates a graphical explanation of averaging fluorescence signals in each frame of a multimodality image, where the frames having a high NIRAF signal are observed. Some frames show NIRAF signals corresponding to vessel morphological or molecular information, while other frames show NIRAF signals corresponding to fluorescence artifacts (noise)

FIG. 3 illustrates a graphical explanation of averaging fluorescence signals in each MMOCT frame of a pullback signal, where frames having a high NIRAF signal can be observed. As shown in FIG. 3, the averaged NIRAF signal in each frame of a pullback can be used to detect the frames which have high NIRAF signal. However, not all the high NIRAF signals correspond to some pathological structure. In other words some isolated frames have small areas of high NIRAF signal (bright ring around OCT image) which have to be reviewed by an experienced expert in order to decide which high NIRAF signals correspond to artifact and which to pathological structure. By applying a method to detect the frames that have NIRAF artifacts and delete them, the accuracy of the MMOCT imaging technique is enhanced.

Specifically, in FIG. 3, a plurality of MMOCT tomographic images including a first image 31, second image 32, third image 33, fourth image 34, fifth image 35 and sixth image 36 are observed with a high NIRAF signal arranged as an arc or ring around the OCT signal. Each of the NIRAF signals respectively corresponds to one or more spikes of an averaged fluorescence signal 30. In FIG. 3, the averaged fluorescence signal 30 includes a plurality of signal peaks indicative of detected fluorescence acquired during a pullback procedure. However, not all of the fluorescence signal peaks are indicative of molecular or pathological information from the vessel wall. For example, the averaged fluorescence signal 30 shows a plurality of narrow signal peaks (spikes) including SPK1, SPK2, SPK3 and SPK4 which respectively correspond to multimodality images 31, 32, 34 and 35. When these images 31, 32, 34 and 35 are analyzed closely by an experienced user (e.g. a pathologist), it is determined that each image has a signal artifact ART1, ART2, ART3, and ART4 which correlates with the signal peaks SPK1, SPK2, SPK3, and SPK4, respectively. These signal peaks SPK1, SPK2, SPK3, and SPK4 are non-uniform and non-periodic signals such that the one or more peak signals from each scan are substantially random.

On the other hand, at least multimodality images 33 and 36 include a true NIRAF signal: true NIRAF1 and true NIRAF2, respectively. Therefore, in FIG. 3, the multimodality images 31, 32, 34 and 35 should be corrected to remove the fluorescence signal because these images include fluorescence artifacts ART1, ART2, ART3 and ART4, respectively. The process of visually analyzing and manually removing fluorescence image artifacts is not efficient, and it can lead to user mistakes and user fatigue. Therefore, the present disclosure provides systems, methods and/or computer-readable media for automatically detecting and removing fluorescence artifacts from catheter-based multimodality OCT-NIRAF images.

<Workflow of a Method for Automatically Detecting and Removing Fluorescence Artifacts>

Figure 4:
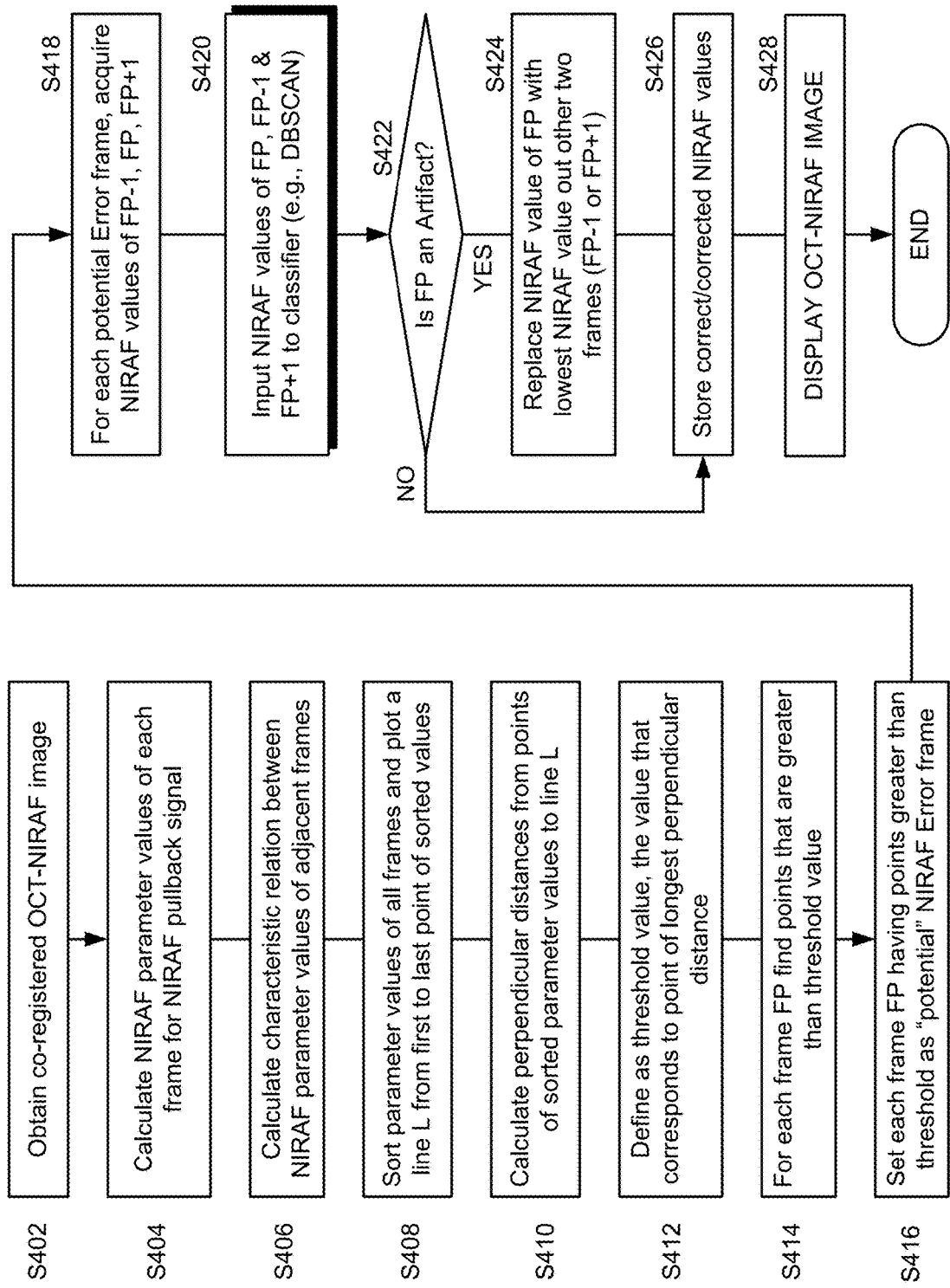
FIG. 4 illustrates an overall workflow of a method for detecting and removing fluorescence artifacts from multimodality images acquired by the MMOCT system 100.

FIG. 4 illustrates an overall workflow of a method for automatically detecting and removing fluorescence artifacts from MMOCT images acquired by the MMOCT system 100. The present disclosure proposes a novel process to fully automatically detect NIRAF artifacts and correct them using a machine learning technology. The process can be divided into two parts: Part I (detect frames suspected to have artifacts), and Part II (confirm and remove artifacts). Notably, Part II takes advantage of unsupervised classifier algorithms to automatically confirm and remove fluorescence artifacts.

Part I includes the following steps: A1) Import the one-dimensional (1D) NIRAF values for each A-line that forms a cross sectional frame of a NIRAF and structural (OCT) image acquired by the imaging system; A2) create a NIRAF standard deviation (std) signal (NSTD) by calculating the NIRAF std in each cross sectional frame; and A3) calculate the absolute difference of the standard deviation signal (NSTD) between adjacent frames (ABS_NSTD). B1) Sort the absolute NIRAF standard deviation ABS_NSTD values; B2) calculate a straight line L from the first to the last (highest to lowest) point of the sorted ABS_NSTD values; B3) calculate the longest perpendicular distance from a point along the sorted ABS_NSTD points to the line L. C1) Define as a threshold standard deviation value (Thr_std value), which is the value that corresponds to the point of the highest perpendicular distance; and C2) define as potential NIRAF error frames each frame (FP) that has one or more points of ABS_NSTD greater than the Thr_std value.

Part II includes the following steps: D1) For each potential NIRAF error frame define a set of points as the NIRAF values of FP−1, FP, and FP+1; D2) apply "unsupervised two class clustering" using a classifying algorithm, such as the density-based clustering non-parametric algorithm (DB-SCAN) to detect the values that correspond to NIRAF artifacts; and E) replace the values that correspond to NIRAF artifacts with the lowest corresponding NIRAF value of the other two frames.

Referring back to FIG. 4, at step S402, the system 100 first imports the intravascular image data acquired by the multimodality catheter. In one embodiment, the multimodality image data includes a series of B-scan frames of OCT data and NIRAF data.

<Step 402: Acquire Multimodality Image>

In one or more embodiments, multimodality images are acquired in situ during interventional procedures, and data is processed in real-time while the catheter system performs in-vivo imaging. In this case, it is important that the system 100 can perform all imaging processing algorithms expeditiously, efficiently, and with high accuracy. In other embodiments, the multimodality images can be acquired a priori (pre-acquired), and the system 100 may process the multimodality images offline after an interventional procedure. Nevertheless, whenever the system is detecting and correcting image artifacts, it is advantageous to reduce processing times, increase accuracy, and reduce user fatigue. This is achieved by a process of determining an automatic threshold value (automatic thresholding) implemented by sorting the std values and finding a maximum perpendicular distance with the use of unsupervised machine learning classification techniques to detect the frame's NIRAF values that correspond to signal artifacts.

<Step 404: Calculate NIRAF Parameter Values of Each Image Frame>

Once the intravascular image data is acquired by the processor of the MMOCT system, the processor is configured to analyze the image data of each B-scan frame on a line-by-line basis. As step S404, analysis of the image data includes the detection and/or calculation of one or more characteristic parameters of the NIRAF signal. Characteristic parameters include those relevant to determining whether the fluorescence signal is a true NIRAF signal or an artifact. In one embodiment, the intensity standard deviation of the NIRAF signal is calculated for each B-scan frame. In other embodiments, other parameters of the NIRAF signal, such as peak intensities, the mean signal intensity, pixel saturation, etc., can be applicable.

In order to calculate the standard deviation (std) of each image frame which has N NIRAF signal values, the following formula [EQ. 1] is used:

$$std = \sqrt{\frac{1}{N} \sum_{i=1}^{N} (xi - \mu)^2}, \qquad \text{EQ. 1}$$

where $xi$ is a NIRAF value for $i=1$ to $N$, and $\mu$ is the mean value for all values of $xi$.

Figure 5:
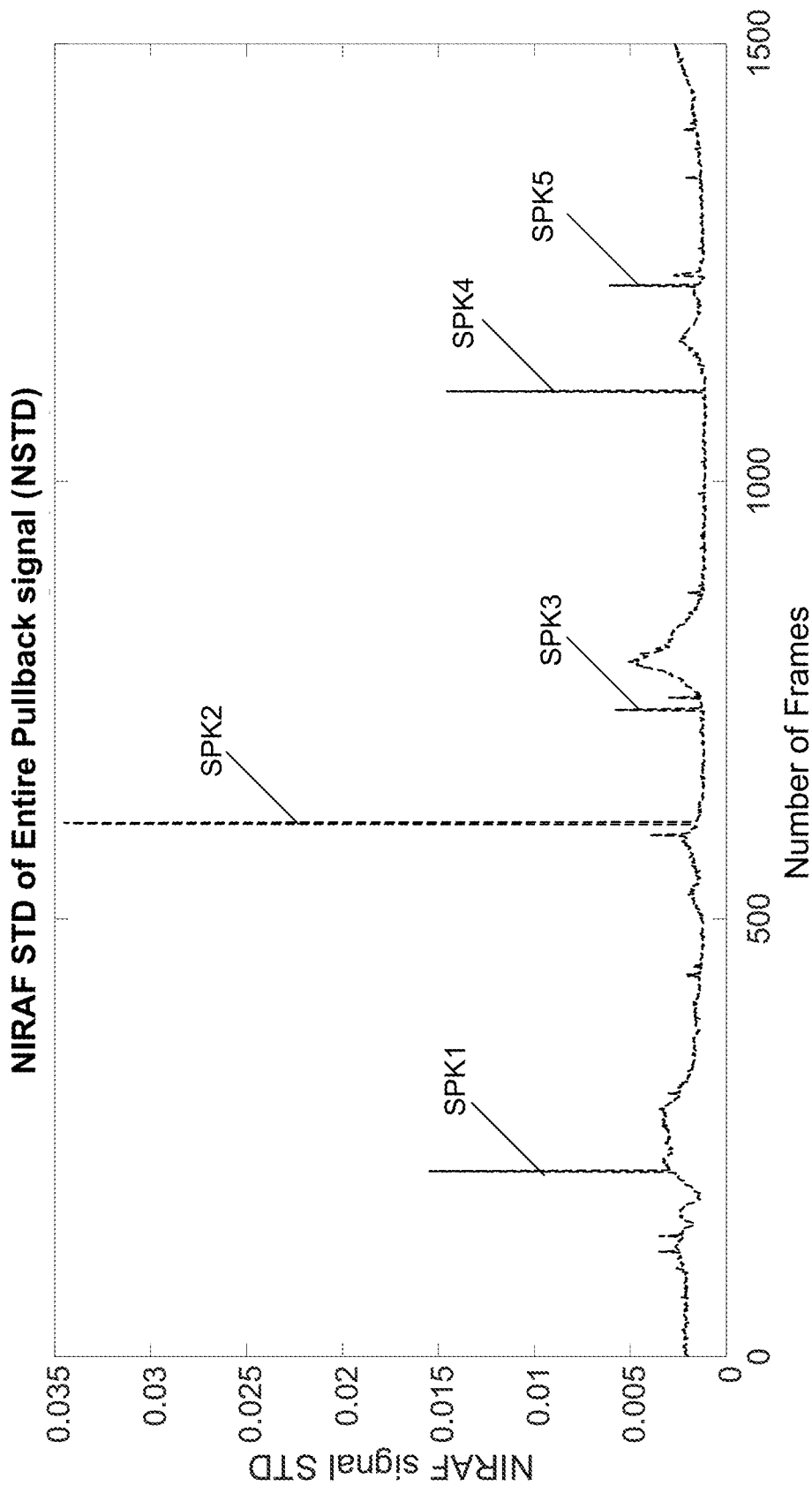
FIG. 5 illustrates an example of calculating signal standard deviation of a NIRAF signal (NSTD) of each frame in an entire pullback operation.
Figure 6:
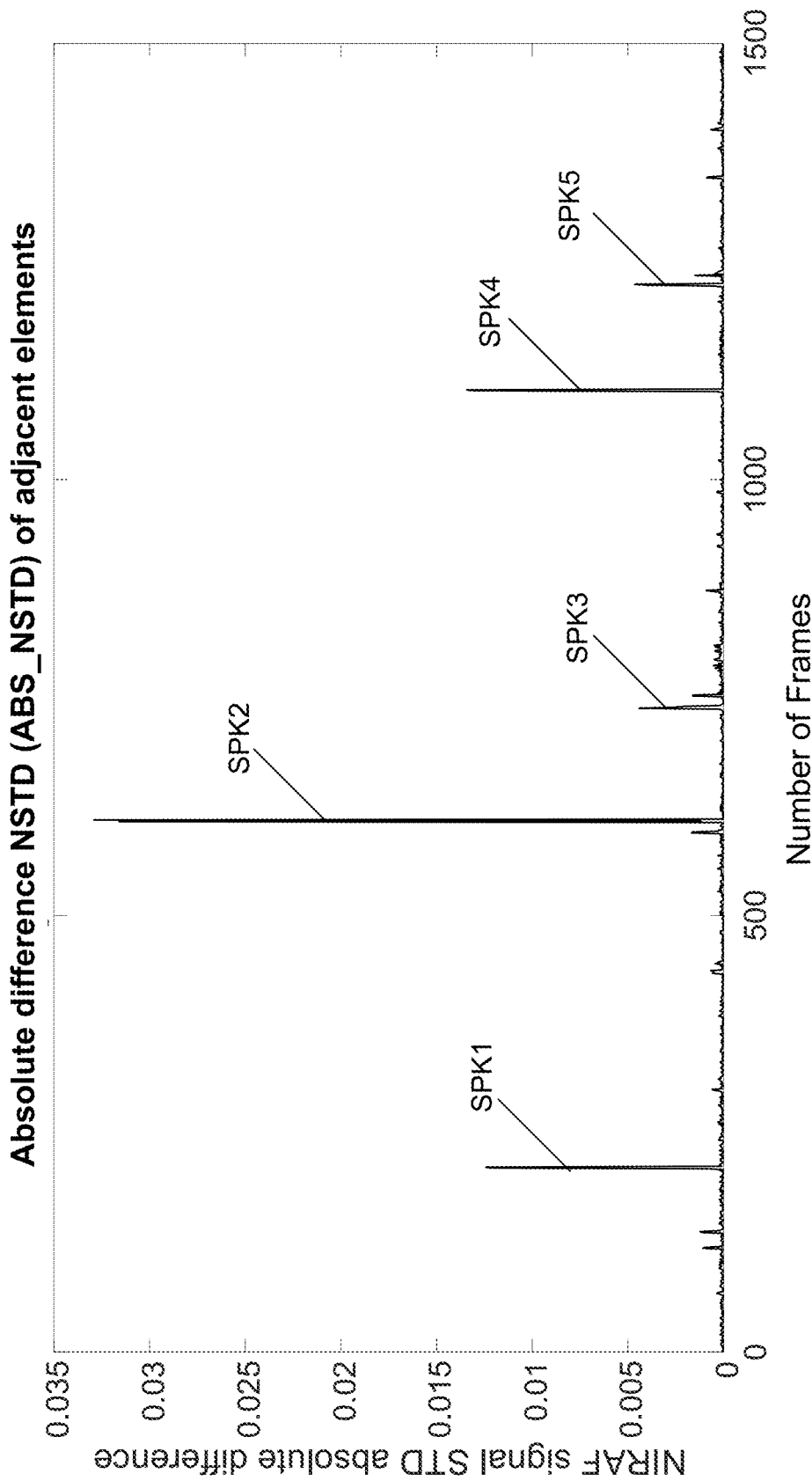
FIG. 6 illustrates the absolute difference of the NSTD in adjacent elements.

At step S406, the system calculates an absolute difference between NIRAF standard deviation (NTSD) values of adjacent frames in the entire pullback signal or in a section of the pullback signal suspected to have NIRAF artifacts. The NSTD of each frame for a desired length of pullback signal is shown in FIG. 5, and the absolute difference for adjacent elements ABS_NSTD is shown in FIG. 6. It can be appreciated from FIG. 3, FIG. 5 and FIG. 6 that the task of determining pathological structures from the multimodality images can be simplified by detecting the spikes (peaks) of the NIRAF signal and defining an appropriate threshold value for differentiating between artifact and non-artifact (true NIRAF) signals. However, since each vessel geometry and the corresponding catheter parameters (catheter size, length, etc.) will be different for each situation (e.g., different for each patient or for each different catheter used), a global threshold applicable to all situations would not be an ideal solution. Therefore, the present disclosure proposes the process of determining an automatic threshold value (automatic thresholding) implemented by sorting the std values and finding a maximum perpendicular distance between a curve of the sorted std values and a straight line from the highest to the lowest std value, combined with the use of unsupervised machine learning classification techniques to detect the frame's NIRAF values that correspond to signal artifacts. Once the signal artifacts are detected, the system can filter out the artifacts and produce a more accurate multimodality image.

Figure 7:
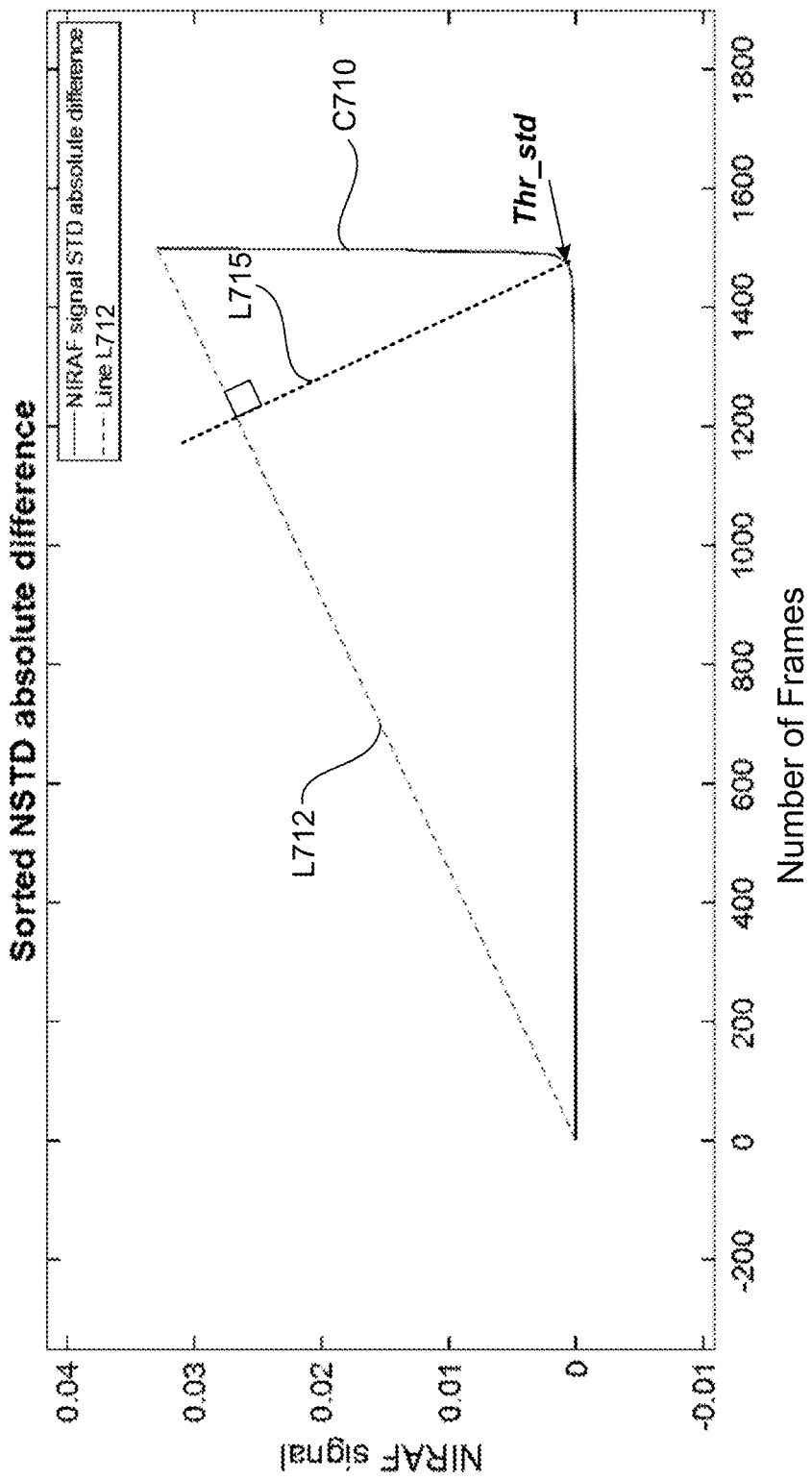
FIG. 7 illustrates an example of sorted absolute difference (ABS_NSTD) values 710, a line L that connects the first to last (lowest to highest) point of the NTSD, and a perpendicular to line L having a maximum distance. A point on the sorted ABS_NSTD absolute difference that intersects the maximum perpendicular distance is defined as a threshold value (Thr_std) for separating image frames having potential NIRAF artifact (noise) values from frames having a true NIRAL signal.

Specifically, referring back to FIG. 4, at step S408, the system is configured to sort the absolute difference ABS_NSTD values for all frames from low to high. After the absolute difference ABS_NSTD is sorted, the system arranges the values on a curve C710, and calculates and plots a line L712 from the first to the last point of the sorted ABS_NSTD values, as shown in FIG. 7. In FIG. 7, for the entire pullback signal, the NIRAF std (NTSD) values are sorted from lowest to highest to form the curve C710. Then, a straight line L712 is traced to connect the first and last points of the sorted ABS_NSTD values.

Figure 8:
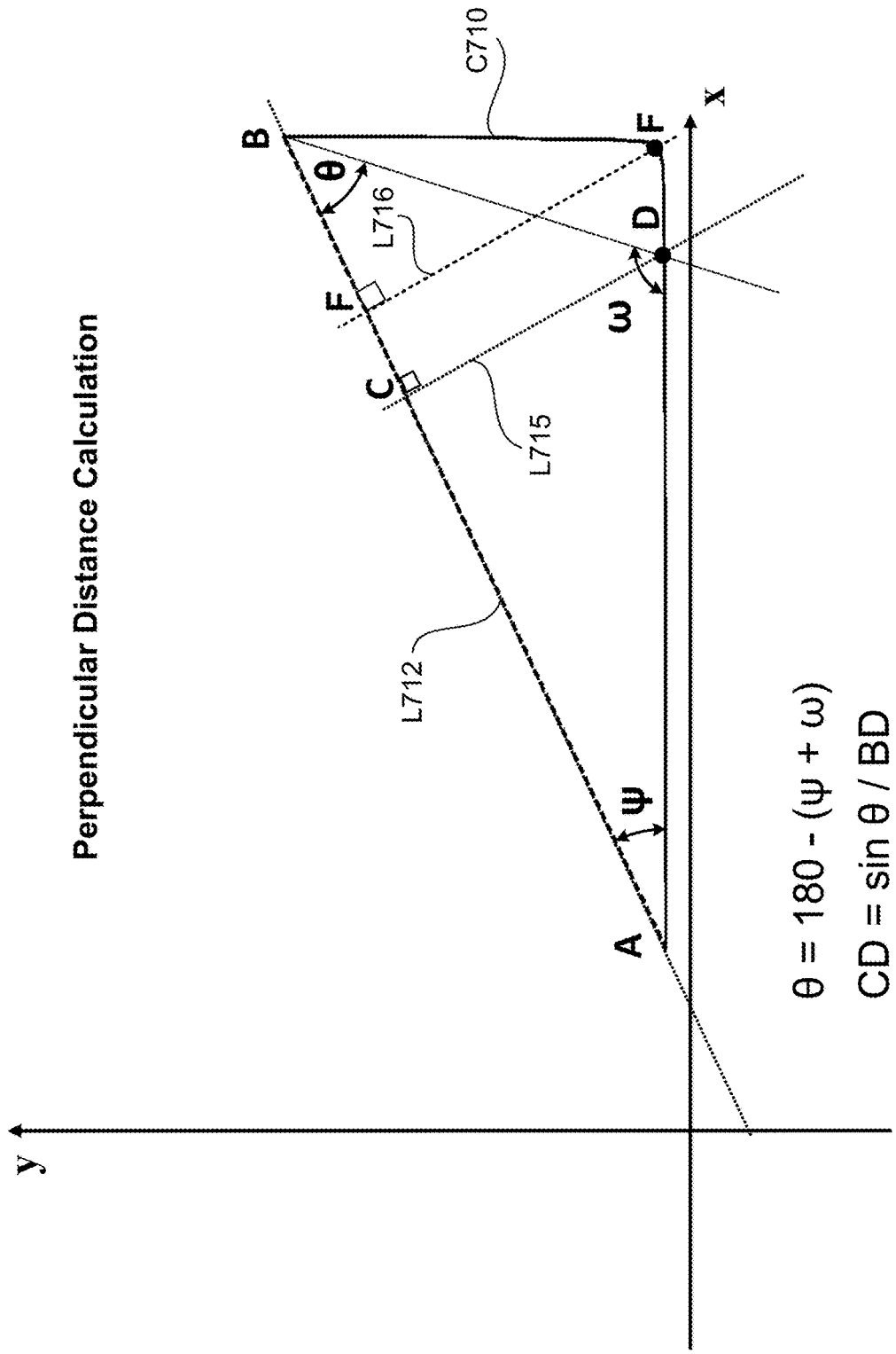
FIG. 8 illustrates a schematic for describing a procedure to calculate the maximum distance from sorted absolute difference (ABS_NSTD) values 710 to the line L 712.
Figure 9:
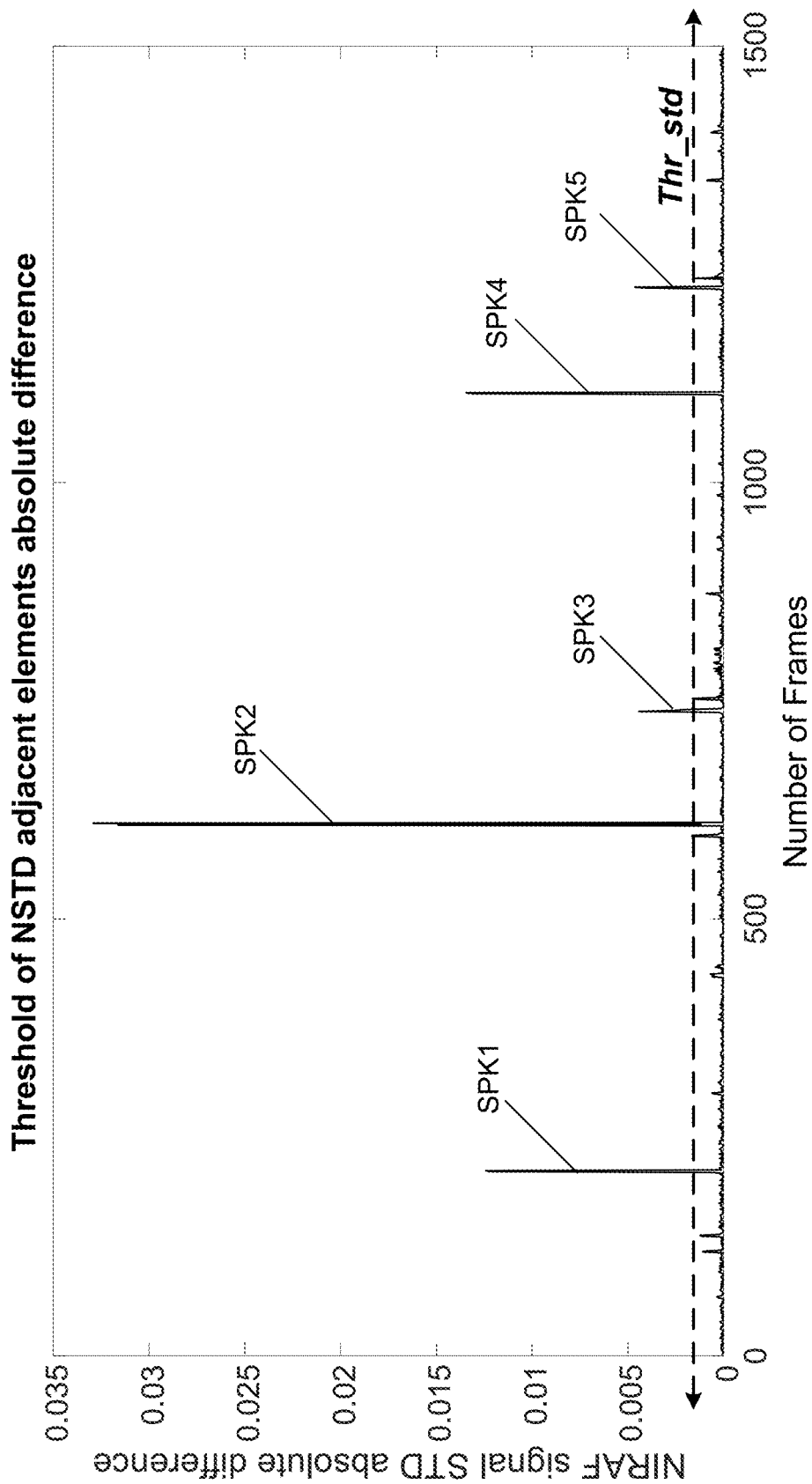
FIG. 9 shows an example of thresholding (comparing the threshold (Thr_std) to the unsorted NSTD values.

At step S410, for each point of the sorted ABS_NSTD values, the system is configured to calculate a perpendicular distance from curve C710 of sorted ABS_NSTD values to the line L712. A schematic description of the perpendicular distance calculation procedure is shown in FIG. 8.

Perpendicular distance calculation: As shown in FIG. 8, for a given point D along curve C710 of sorted ABS_NSTD values, a line L715 perpendicular to line L712 crosses the line segment AB at a point C. To calculate the distance CD, basic trigonometry dictates that distance CD can be obtained by solving EQ. 2.

$$CD = \frac{\sin \theta}{BD} \qquad \text{EQ. 2}$$

where $\theta=180°-(\psi+\omega)$, and the angles $\omega$ and $\psi$ can be calculated by the using the slopes of the known AB and DB lines. Here, points A, B, C have known coordinate points along the straight line L712 on the x-y plane of FIG. 8 at locations: A=(x1, y1), B=(x2, y2), and C=(x3, y3). Therefore, using the slope along line L712, the distance between any two points is calculated as the Euclidean distance defined by the Pythagorean theorem such that, for example, distance of segment AB=$[(x2-x1)^2+(y2-y1)^2]^{1/2}$. The same procedure can be applied to calculate the distance of a line L715 perpendicular to line L712, and to calculate the distance of a line L716 also perpendicular to line L712 until a point F along curve C710 is found as the longest distance between line L712 and curve C710.

At Step S412 of FIG. 4, the point of ABS_NSTD which has the longest perpendicular distance from curve C710 to line L712 is defined as the standard deviation threshold (Thr_std) value. Here, it is important to note the significance of why the threshold is the "longest distance" (or more specifically "the longest perpendicular distance") between the curve C710 of the sorted standard deviation values and the straight line L712 because the application of this novel calculation can have various advantages in artifact detection accuracy and in minimizing image processing time. In the present disclosure, the inventor proposes a simplified way to apply the automatic thresholding technique in that there is only one threshold for each image frame, and the physical meaning in this is that the threshold is a single value or point of the curve of sorted values (e.g., NIRAF absolute difference) function. In other words, the threshold represents a point where the curve C710 suddenly changes the curvature or direction of the function. So the threshold cannot be other than "the longest perpendicular distance") since it has a mathematical meaning; the sudden change of curvature or the tangent point of the function (which is a single value).

At step S414, the system 100 finds points in each frame FP which have NIRAF values greater than the std threshold. At step S416, the system 100 sets all frames FP with NIRAF STD absolute difference value greater than Thr_std as potential NIRAF error frames. Here, at step S416, it must be noted that the system has not yet determined which frames include fluorescence artifacts; rather the system 100 has merely determined frames that have high NIRAF signal values (spikes) greater than a threshold value Thr_std.

The maximum perpendicular distance, which defines the threshold value, is not limited to a maximum distance between sorted standard deviation values and the straight line L between maximum and minimum values of the standard deviation curve C710. In other embodiments, steps S404, S406, and S408 can be modified so that the system can be configured to calculate and sort other parameters of the NIRAF signal. For example, in an alternative embodiment, at step S404, the system can be configured to calculate or detect the maximum intensity of the fluorescence signal in each B-scan frame. In another embodiment, at step S404, the system can be configured to detect all signal peaks of the fluorescence signal in each B-scan frame. Further alternatively, at step S404, the system can be configured to calculate the mean intensity (e.g., in milli-Wats of power), or the mean of all peak signal values (e.g., in pixel values) of the fluorescence in each B-scan frame. At step S406, the system can calculate the absolute difference in maximum intensity or mean intensity or mean peak signal values between adjacent, or interleaved, or predetermined number of B-scan frames. At step S408, the system sorts the values obtained at step S406 for all frames in the entire pullback signal. Thereafter, the sorted values are arranged in a curve C710 (a sorted values function) as shown in FIG. 7. The remaining steps S410-S416 are carried out as described below to designate each frame FP having values equal to or greater than the threshold value as a potential error frame.

<Detect NIRAF Artifacts in MMOCT Frames and Correct Them>

At the second part of the workflow, for each frame FP designated as a potential error frame, a set of points is defined as the NIRAF values of the current frame FP, a previous frame FP−1, and a next frame FP+1. Then, the NIRAF values of these frames are processed by a predictive algorithm using machine learning methods. Machine learning may include an unsupervised learning model (such as density based clustering), or a supervised learning model (such as a linear classifier, an artificial neural network or a nearest-neighbor classifier).

In the present disclosure, at step S418, for each frame (FP) that has NIRAF signal values (spikes) greater than threshold Thr_std, the system acquires values for the preceding frame FP−1 and for the subsequent frame FP+1. Here, it should be noted that the preceding frame FP−1 and subsequent frame FP+1 are not necessarily the immediately before or after frame with respect to the current frame FP. In at least some embodiments, the preceding frame FP−1 or the subsequent frame FP+1 can be an average of a number of preceding or subsequent frames, or a frame within a certain distance (within 0.5 mm) preceding or subsequent to the current frame FP.

At step S420, the system inputs (transfers) the NIRAF values of the frames FP−1 and FP+1 acquired at S418, together with the frame FP set at S416, into an unsupervised clustering module. In one embodiment, the unsupervised clustering module can be implemented by a two-class classifier. In a two-class classifier, the variance threshold is used as a simple baseline approach to feature selection. The classifier removes all features with a variance which does not meet the threshold. By default, a two-class classifier first removes all zero-variance features, i.e., features that have the same value in all samples. Then, the classifier separates the population of values in two groups. This assumes that features with a higher variance than the threshold may contain more useful information. In the present disclosure, a two-class classifier can be implemented by the density-based clustering non-parametric algorithm DBSCAN. DBSCAN stands for Density-Based Spatial Clustering of Applications with Noise. The principle of DBSCAN is to find neighborhoods of data points which exceed a certain density threshold. The density threshold is defined by two parameters: the radius of the neighborhood (eps) and the minimum number of neighbors/data points (minPts) within the radius of the neighborhood. See, for example, Martin et al., "*A density-based algorithm for discovering clusters in large spatial databases with noise*"; Proceedings of the Second International *Conference on Knowledge Discovery and Data Mining* (KDD-96); AAAI Press, pp. 226-231.

In the present disclosure, at step S422, the two classes of the DBSCAN two-class algorithm corresponds to classifying the NIRAF values either as NIRAF artifacts or not artifacts. Therefore, at step S422, if the algorithm determines that the NIRAF value is an artifact, YES at S422, the process advances to step s424. As previously described, fluorescence artifacts can noise artifacts and other types of artifacts. At step S424, the system is configured to replace the NIRAF noise class values (noise artifact) with the lowest corresponding NIRAF values of the other two frames (lowest of the FP−1 or FP+1 fluorescence values). This corrects the NIRAF artifact value with a corrected NIRAF signal value. Therefore, at step S426, the system stores the corrected NIRAF signal value in the system's memory.

At step S422, if the algorithm determines that the NIRAF value is not an artifact, NO at S422, the process advances to step s426. In this case, the system confirms that the NIRAF value is a true NIRAF signal. Therefore, at step S426, the system stores the originally correct NIRAF value in the system's memory.

At step s428, the system displays the multimodality image including the OCT data and NIRAF data without artifacts. As understood from the foregoing description, the NIRAF data can include the correct fluorescence signal corresponding to a true NIRAF value detected in the original analysis of the multimodality image frames, and/or a corrected fluorescence signal corresponding to corrected NIRAF values after applying classification by the clustering algorithm.

<Density-Based Clustering Algorithms>

According to the present disclosure, for a set of points in the image space and for E being a parameter that specifies a radius with respect to some point p, the DBSCAN algorithm classifies the set of points as belonging to the same density cluster as:
  a point p being a core point if at least minPts (minimum number of points, including p, within ε) points are within distance ε of point p,
  a point q is directly reachable from p if q is within ε from p (core point), and
  a point q is reachable from p if there is a path p1, ..., pn, with p1=p and pn=q, where each pi+1 is directly reachable from pi.

Figure 10:
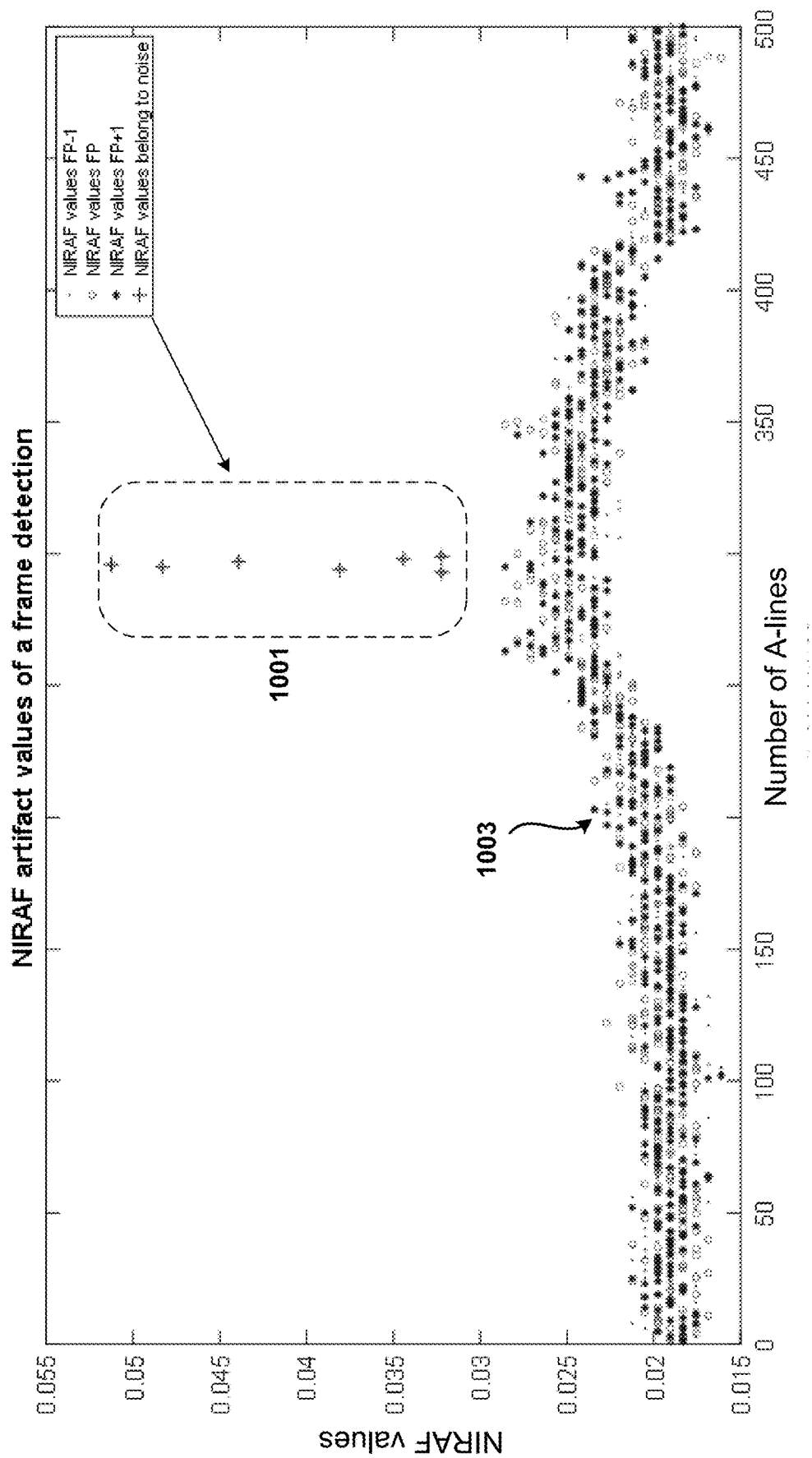
FIG. 10 illustrates unsupervised two class classifier (DBSCAN) in a frame that was detected as having NIRAF artifacts. The points corresponding to NIRAF artifacts (noise) are detected by the DBSCAN classifier algorithm.
Figure 11:
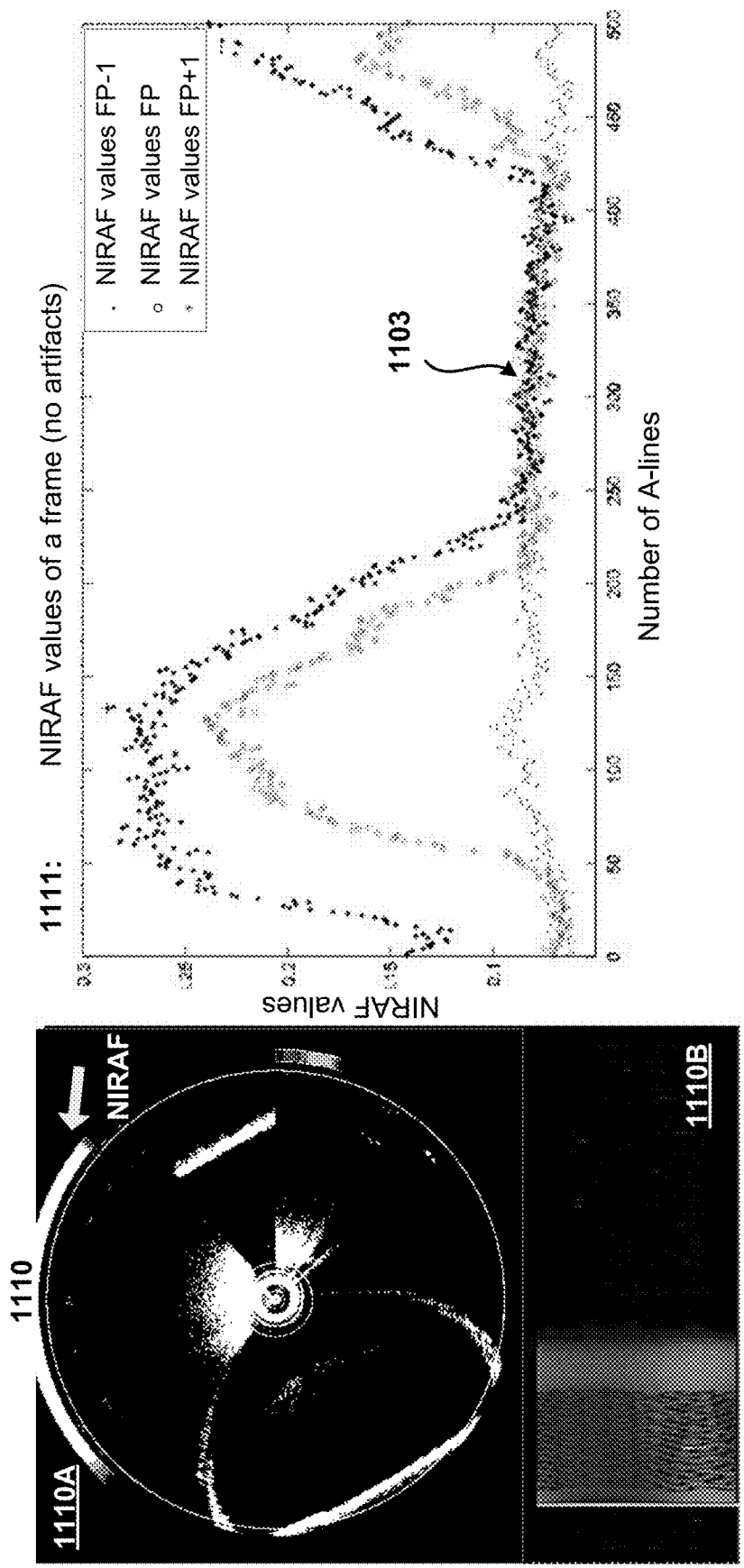
FIG. 11 illustrates a first example of correcting artifacts in a multimodality image. In this case, an image frame (FP) is shown on the right of the drawings as tomographic view (top) and longitudinal view (bottom) where NIRAF artifacts are detected due to a sudden high NIRAF signal, but the DBSCAN algorithm (left side of drawing) did not detect any noisy NIRAF values.
Figure 12:
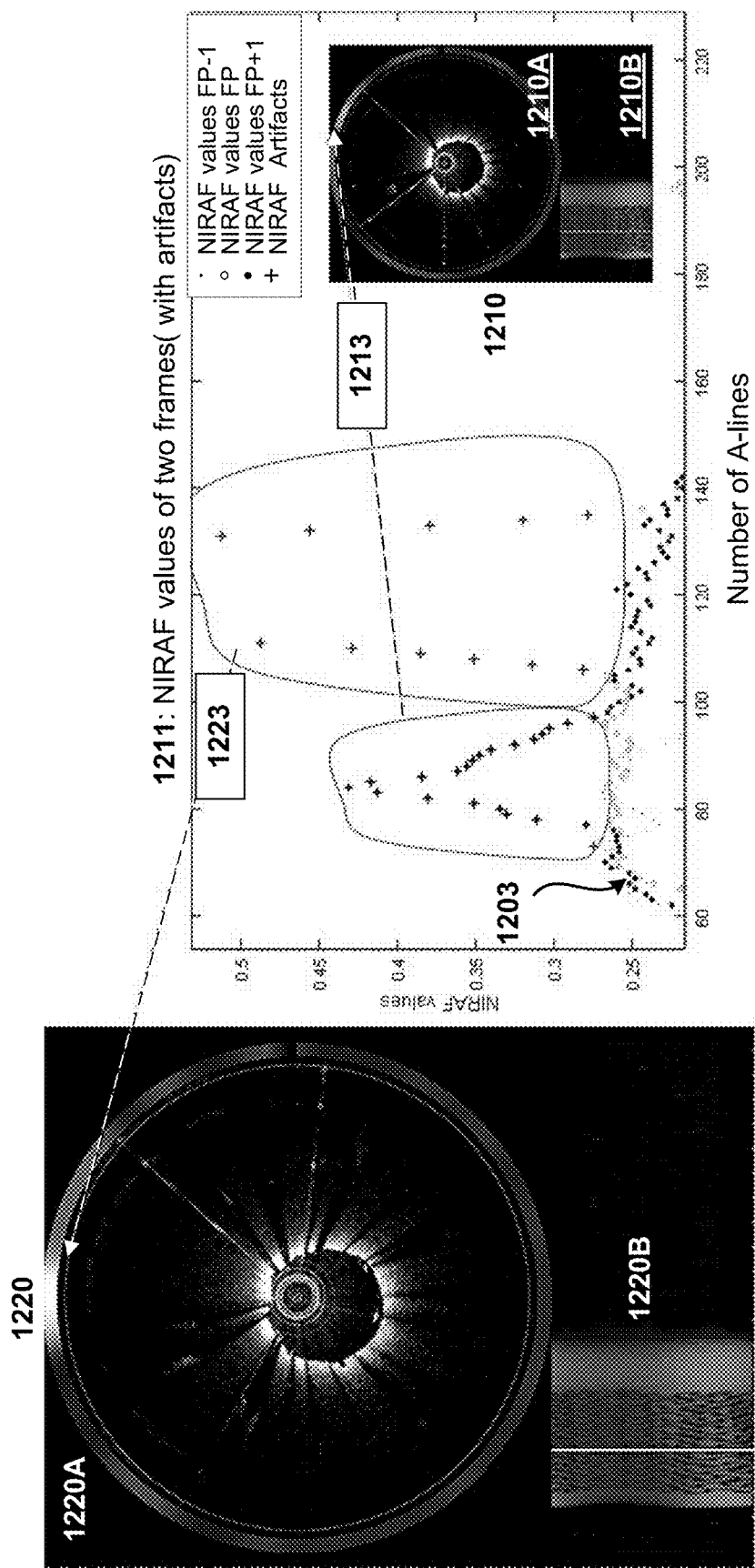
FIG. 12 illustrates a case in which a current frame (FP) on the right of the drawing and a next frame (FP+1) on the left of the drawing are shown as a tomographic view (top) and as a longitudinal view (bottom). In this case, the DBSCAN algorithm has detected NIRAF artifact values (noise) in the current frame (FP) and in the next frame (FP+1)

Examples of DBSCAN algorithm classification results are shown in FIG. 10, FIG. 11, and FIG. 12. FIG. 10 illustrates a case in which multimodality image is analyzed according to the process of FIG. 4, and the process determines the image includes true NIRAF signal values 1003 and NIRAF artifacts (noise) values 1001. First, by referring back to FIG. 4, it is understood that a multimodality image is analyzed either line-by-line or frame by frame to determine if the sorted points of the ABS_NSTD signal are greater than threshold Thr_std (see steps S404 through S416 of FIG. 4). Thereafter, each frame FP is processed according to steps S418 through S422 of FIG. 4 where the unsupervised classifier algorithm DBSCAN determines whether the points of frame FP greater than threshold Thr_std are artifact-noise or not. As shown in FIG. 10, points enclosed in dashed line are determined to be NIRAF artifacts (noise) 1001, which will be removed and replaced by the lowest of the values of either FP−1 or FP+1.

FIG. 11 illustrates an example of examining an OCT-NIRAF image for possible NIRAF artifacts. In FIG. 11, an image frame 1110 is shown on the left side and a graph of NIRAF values 1111 is shown on the right side of the drawing. The image frame 1110 is shown as tomographic view 1110A (top) and a longitudinal view 1110B (bottom). The graph of NIRAF values 1111 includes a plot 1103 of NIRAF values for the current frame FP (frame 1110), NIRAF values for a previous frame FP−1, and NIRAF values for a subsequent frame FP+1.

In the case shown by FIG. 11, although the frame 1110A is detected by the first part of the algorithm as a possible NIRAF artifact [since the frame had an std over the calculated threshold (max perpendicular method)], the DBSCAN algorithm does not find any part of the signal (FP) in this frame 1110A or in the signals of the previous (FP−1) and subsequent (FP+1) frames as artifact.

FIG. 12 illustrates another example of detecting NIRAF artifacts in a multimodality image acquired during pullback. In FIG. 12, an image frame (FP) 1210 shown on the right-side of the drawing in tomographic view 1210A and longitudinal view 1210B is detected as a possible artifact by the first part of the algorithm (steps S402-S416). As the algorithm progresses to the second part (steps S418-S422), the DBSCAN algorithm detects the noisy NIRAF values in the frame FP 1210, a previous frame FP−1 (not shown), and in the next frame (FP+1) 1220. More specifically, a current image frame 1210 shown on the right-side of the drawing is determined to include a possible NIRAF artifact 1213 (high NIRAF signal). Then, a next image frame 1220 shown on the left side of the drawing is also determined to include a possible NIRAF artifact 1223. In this case, the DBSCAN algorithm detects the NIRAF artifact (noise) values 1213 and 1214 clustered as shown above the plot 1203 of NIRAF values corresponding to a current frame FP, a previous frame FP−1 and a next frame FP+1.

Figure 13:
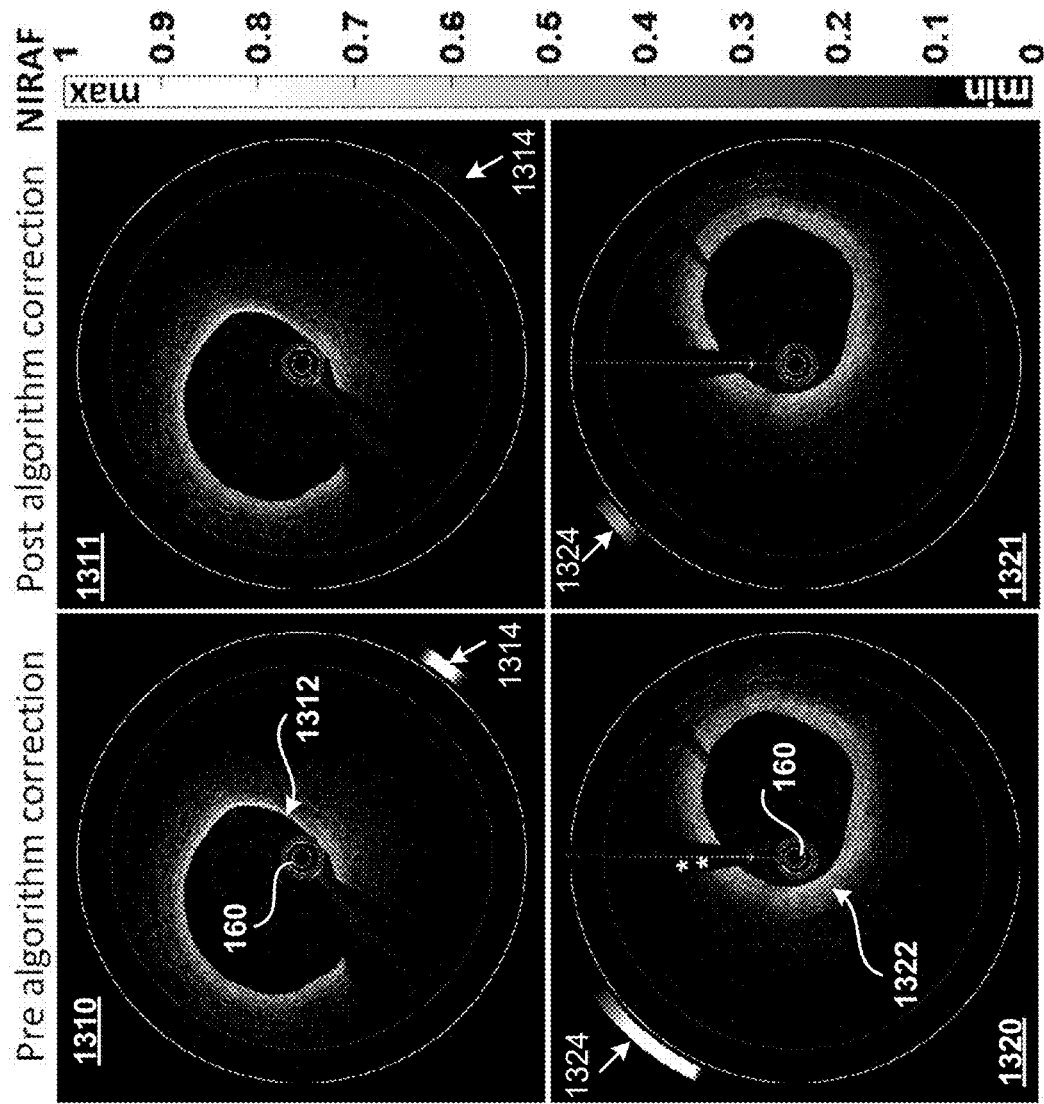
FIG. 13 shows two different application examples showing the NIRAF artifact before (left: top 4 o'clock-left bottom 11 o'clock) and corrected after the application of the present algorithm.

FIG. 13 illustrates an example of correcting (removing) NIRAF artifacts (noise) from two multimodality images. In FIG. 13, prior to algorithm correction, a first multimodality image 1310 shows OCT data 1312 surrounded by a fluorescence signal 1314, and a second multimodality image 1320 shows OCT data 1322 surrounded by a fluorescence signal 1324. In the first multimodality image 1310, it is evident that the catheter 160 is close to or in contact with the lumen edge (vessel wall). As explained elsewhere in this disclosure, one of the reasons for observing a false positive NIRAF signal is that sometimes the catheter can be too close or touching the vessel wall. In the second multimodality image 1320, the catheter 160 does not appear to be touching the vessel wall but there is a shadow () from the guidewire. In this case too, the fluorescence signal 1324 can be at least partially augmented by an artifact (noise) caused by the presence of the guidewire. In other words, in the first multimodality image 1310 and second multimodality image 1320, the fluorescence signal 1314 and the fluorescence signal 1324 could be NIRAF artifacts (noise) not corresponding to pathological information of the vessel. Therefore, artifact correction is necessary. This correction is performed automatically by the process outlined in FIG. 4**.

After algorithm correction, the first multimodality image 1310 shows only the OCT data 1312 without the fluorescence signal 1314, and the second multimodality image 1320 shows the fluorescence signal 1324 with substantially reduced intensity. Therefore, in FIG. 13, the algorithm correction performed on the multimodality images demonstrates the DBSCAN algorithm is effective in detecting and removing, or detecting and correcting, NIRAF artifact values (noise) which do not correspond to morphological information of the lumen.

Those of ordinary skill in the art will appreciate that the clustering algorithm to classify the NIRAF artifact values is not limited to the DBSCAN algorithm. Although the unsupervised DBSCAN algorithm has been proven to be the most effective in accurately detecting, removing and correcting NIRAF artifacts, the inventor considers other spatial clustering algorithms can be applicable without departing from the above described processes. Other types of spatial clustering algorithms may include any supervised two-class algorithm that will require a level of training. In other words, the algorithm will learn from a dataset of NIRAF values that correspond to artifacts and not. Here, referring back to FIG. 4, the classification algorithm can use the confirmed NIRAF signal values (the originally correct fluorescence signal and the corrected fluorescence signal) obtained at step S426 as training data for a supervised learning algorithm. Such supervised algorithms can include, but are not limited to, neural networks, support vector machines, and random forests, among others. For example, Athanasiou et al., in "*Methodology for fully automated segmentation and plaque characterization in intracoronary optical coherence tomography images*", Journal of biomedical optics, 2014, describes such a method which uses the aforementioned supervised algorithms to classify tissue appearance in OCT image. Supervised algorithms including neural networks, support vector machines, and random forests (R), as used by Athanasiou et al., for plaque characterization, can be adapted for determining whether the potential error frame is a fluorescence artifact or not.

Software Related Disclosure

At least certain aspects of the exemplary embodiments described herein can be realized by a computer of a system or apparatus that reads out and executes computer executable instructions (e.g., one or more programs or executable code) recorded on a storage medium (which may also be referred to as a 'non-transitory computer-readable storage medium') to perform functions of one or more block diagrams or flowchart diagrams described above. For example computer 200 shown in FIG. 1 may be implemented by a general purpose computer or similar data processing device connected to peripheral hardware. The computer may include various components known to a person having ordinary skill in the art. For example, the computer 200 may include signal processor implemented by one or more circuits (e.g., a field programmable gate array (FPGA) or an application specific integrated circuit (ASIC)) for performing the functions of one or more of the above-described embodiment(s), by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)), and may include a network of separate computers or separate processors to read out and execute the computer executable instructions. The computer executable instructions may be provided to the computer, for example, from a cloud-based network or from the storage medium. The storage medium may include, for example, one or more of a hard disk, a random-access memory (RAM), a read only memory (ROM), a storage of distributed computing systems, an optical media device (such as a compact disc (CD), digital versatile disc (DVD), or Blu-ray Disc (BD)™), a flash memory device, a memory card, a remote storage device (cloud storage), and the like. The computer may include an input/output (I/O) interface to receive and/or send communication signals (data) to input and output devices, which may include a keyboard, a display, a mouse, a touch screen, touchless interface (e.g., a gesture recognition device), a printing device, a light pen, an optical storage device, a scanner, a microphone, a camera, a USB drive, communication network (either wired or wireless) interface.

Other Embodiments and Modifications Thereof

In referring to the description, specific details are set forth in order to provide a thorough understanding of the examples disclosed. In other instances, well-known methods, procedures, components and circuits have not been described in detail as not to unnecessarily lengthen the present disclosure. Unless defined otherwise herein, all technical and scientific terms used herein have the same meaning as commonly understood by persons of ordinary skill in the art to which this disclosure belongs. In that regard, breadth and scope of the present disclosure is not limited by the specification or drawings, but rather only by the plain meaning of the claim terms employed.

By applying the methods and systems described herein, an automatic threshold is calculated for each signal series of an MMOCT pullback. By using density-based unsupervised machine learning algorithms the signal values that correspond to artifacts can be detected only when they are present, reducing any possible false positive detection. By using the proposed automated method, NIRAF artifacts in non-uniform and non-periodic signals can be fully automatically detected and removed without or with minimum manual intervention from a user. In particular, automatic thresholding can be implemented by sorting the NIRAF standard deviation values (NSTD) values, and finding a maximum perpendicular distance from the sorted ABS_N-STD values to a line L plotted from the first to last (lowest to highest) of the sorted values. A threshold for separating the NIRAF error frames (from non-error frames) is automatically calculated based on the longest perpendicular distance. Use of machine learning (ML), in particular the use of unsupervised machine learning clustering, to detect the frame's NIRAF values that correspond to NIRAF artifacts is advantageous because unsupervised ML does not require a predefined threshold to classify the NIRAF values as artifact or non-artifact. In other words, the use of unsupervised ML to classify the NIRAF values as artifact or not artifact increases the generalization of the algorithm for detecting and removing artifacts in non-uniform and non-periodic signals in a fully automatic manner. Advantageously, one or more of the novel systems, methods, and/or computer readable media can minimize the user's post processing effort and automate the detection and correction (removal) of florescence signal artifacts multimodality OCT-NIRAF images.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

What is claimed is:

1. A system, comprising:
a catheter configured to acquire a multimodality image of a biological lumen, wherein the multimodality image of the biological lumen includes optical coherence tomography (OCT) data co-registered with fluorescence data; and
an image processing device having a memory configured to store instructions that when executed by a processor, cause the processor to:
receive a plurality of B-scan frames of the OCT and fluorescence data of the multimodality image acquired by the catheter;
for the plurality of B-scan frames, calculate a parameter value of the fluorescence data for each B-scan frame;
sort the parameter values of the plurality of B-scan frames from lowest to highest and arrange the sorted parameter values along a parameter curve;
trace a straight line from the lowest value to the highest value of the parameter curve;
calculate a maximum perpendicular distance between the straight line and the parameter curve;
set the value along the parameter curve corresponding to the maximum perpendicular distance as a threshold value;
compare the fluorescence data values of each B-scan frame to the threshold value; and
for each B-scan frame detected to have a fluorescence data value equal to or higher than the threshold value, set that B-scan frame as a potential error frame.

2. The system according to claim 1,
wherein the processor is further configured to, for each B-scan frame that has been set as a potential error frame,
acquire a fluorescence data value for a preceding B-scan frame and a fluorescence data value for a subsequent B-scan frame relative to the B-scan frame set as the potential error frame;
input the fluorescence data value of the potential error frame, the fluorescence data value of the preceding B-scan frame, and the fluorescence data value of the subsequent B-scan frame into a two-class classifier; and
determine, using the two-class classifier, whether the fluorescence data value of the potential error frame is a true fluorescence artifact or not.

3. The system according to claim 2,
wherein the processor is further configured to average the fluorescence data values in ach B-scan frame, and generate an averaged fluorescence signal having one or more peaks for that B-scan frame,
wherein the two-class classifier includes a machine learning classification algorithm configured to determine whether the fluorescence data value of the potential error frame corresponds to one or more known fluorescence artifacts, and
wherein the one or more known fluorescence artifacts correspond to noise artifacts defined by the highest peaks in the averaged fluorescence signal of each B-scan frame.

4. The system according to claim 3,
wherein the two-class classifier includes a supervised algorithm trained to determine whether the peak signals higher than the threshold value correspond to one or more known fluorescence artifacts with which the algorithm has been trained,
wherein the processor is further configured to remove the peak signals higher than the threshold value from the multimodality image.

5. The system according to claim 2,
wherein the two-class classifier includes a supervised machine learning classification algorithm selected from the group consisting of a neural network algorithm, a support vector machine (SVM) algorithm, a Nearest Neighbor (NN) algorithm, a k-NN algorithm, and a random forest (RF) algorithm, or
wherein the two-class classifier includes an unsupervised machine learning two-class clustering algorithm implemented by the Density-Based Spatial Clustering of Applications with Noise (DBSCAN) algorithm.

6. The system according to claim 2,
wherein, in a case where the two-class classifier determines that the fluorescence data value of the potential error frame is a fluorescence artifact, the processor is configured to replace the fluorescence data value of the potential error frame with the lower of the fluorescence data value of the preceding B-scan frame or the fluorescence data value of the subsequent B-scan frame.

7. The system according to claim 2,
wherein, in a case where the two-class classifier determines that the fluorescence data value of the potential error frame is not a fluorescence artifact, the processor is configured to output the fluorescence data value of the potential error frame as a true fluorescence data value of a correct B-scan data frame.

8. The system according to claim 1,
wherein the processor automatically defines the threshold value for each B-scan frame based on the longest perpendicular distance from the straight line to the parameter curve, and
wherein the processor defines as a potential error frame each B-scan frame that has one or more points of the parameter curve equal to or greater than the threshold value.

9. The system according to claim 1,
wherein the parameter value of the fluorescence data values includes one or more of a signal intensity value, a signal peak value, and signal mean value of the fluorescence signal in each B-scan frame, and
wherein the processor is further configured to:
calculate a standard deviation of the fluorescence signal of each B-scan frame using the one or more of the signal intensity value, the signal peak value, and the signal mean value of the fluorescence signal in each B-scan frame, sort the standard deviation values from lowest to highest along a standard deviation curve for the plurality of B-scan frames of the multimodality image;
calculate a straight line from the lowest to the highest point of the standard deviation curve;
calculate a perpendicular distance from the straight line to each point along the standard deviation curve; and
define, as the threshold value, the value along the standard deviation curve that corresponds to the longest perpendicular distance from the straight line to the standard deviation curve.

10. A non-transitory computer-readable medium configured to store instructions that when executed by one or more processors of a computing device, cause the computing device to perform a method of removing artifacts from multimodality image data of a biologic lumen, the method comprising:
acquiring a multimodality image of a biological lumen through a catheter, wherein the multimodality image of the biological lumen includes optical coherence tomography (OCT) data and fluorescence data;
receiving a plurality of B-scan frames of the OCT and fluorescence data of the multimodality image acquired by the catheter;
comparing fluorescence data values of each B-scan frame to a threshold value;
for each B-scan frame detected to have a fluorescence data value equal to or higher than the threshold value, setting the B-scan frame as a potential error frame;
acquiring a fluorescence data value for a preceding B-scan frame and a fluorescence data value for a subsequent B-scan frame relative to the B-scan frame set as the potential error frame;
inputting the fluorescence data value of the potential error frame, the fluorescence data value of the preceding B-scan frame, and the fluorescence data value of the subsequent B-scan frame into a two-class classifier; and
determining, using the two-class classifier, whether the fluorescence data value of the potential error frame is a fluorescence artifact or not,
wherein the two-class classifier includes a machine learning classification algorithm trained to determine whether the fluorescence data value of the potential error frame corresponds to one or more known fluorescence artifacts with which the algorithm has been trained, and
wherein the machine learning classification algorithm is a supervised algorithm selected from the group consisting of a neural network algorithm, a support vector machine (SVM) algorithm, a Nearest Neighbor (NN) algorithm, a k-NN algorithm, and a random forest (RF) algorithm.

11. A method, comprising:
acquiring a multimodality image of a biological lumen during a pullback of a catheter inserted into the biological lumen, the multimodality image including optical coherence tomography (OCT) data co-registered with fluorescence data, the OCT and fluorescence data respectively collected by scanning the lumen with light of first and second wavelengths transmitted through the catheter inserted into the lumen;
analyzing a plurality of B-scan frames of the OCT and fluorescence data of the multimodality image acquired by the catheter, wherein each B-scan frame includes a plurality of A-lines of that B-scan frame;
for the plurality of B-scan frames, calculating a parameter value of the fluorescence data for each B-scan frame;
sorting the parameter values of the plurality of B-scan frames from lowest to highest and arranging the sorted parameter values along a parameter curve;
tracing a straight line from the lowest value to the highest value of the parameter curve;
calculating a maximum perpendicular distance between the straight line and the parameter curve;
setting the value along the parameter curve corresponding to the maximum perpendicular distance as a threshold value;
comparing the fluorescence data values of each B-scan frame to the threshold value; and
for each B-scan frame detected to have a fluorescence data value equal to or higher than the threshold value, setting that B-scan frame as a potential error frame.

12. The method according to claim 11, further comprising:
for each B-scan frame that has been set as a potential error frame, acquiring a fluorescence data value for a preceding B-scan frame and a fluorescence data value for a subsequent B-scan frame relative to the B-scan frame set as the potential error frame;
inputting the fluorescence data value of the potential error frame, the fluorescence data value of the preceding B-scan frame, and the fluorescence data value of the subsequent B-scan frame into a two-class classifier; and
determining, using the two-class classifier, whether the fluorescence data value of the potential error frame is a true fluorescence artifact or not.

13. The method according to claim 12, further comprising:
averaging the fluorescence data values in the B-scan frame set as the potential error frame, and selecting one or more peaks of the averaged fluorescence signal higher than the threshold value, and
determining, using the two-class classifier, whether the one or more peaks of the averaged fluorescence signal correspond to fluorescence noise artifacts or to a true fluorescence signal.

14. The method according to claim 13,
wherein, in a case where the two-class classifier determines that the one or more peaks of the averaged fluorescence signal correspond to fluorescence noise artifacts, the method further comprises removing, from the multimodality image, the one or more peaks of the averaged fluorescence signal higher than the threshold value.

15. The method according to claim 12,
wherein the two-class classifier includes a supervised machine learning classification algorithm selected from the group consisting of a neural network algorithm, a support vector machine (SVM) algorithm, a Nearest Neighbor (NN) algorithm, a k-NN algorithm, and a random forest (RF) algorithm, or
wherein the two-class classifier includes an unsupervised machine learning two-class clustering algorithm implemented by the Density-Based Spatial Clustering of Applications with Noise (DBSCAN) algorithm.

16. The method according to claim 12,
wherein, in a case where the two-class classifier determines that the fluorescence data value of the potential error frame is a fluorescence artifact, the method further comprises replacing the fluorescence data value of the potential error frame with the lower of the fluorescence data value of the preceding B-scan frame or the fluorescence data value of the subsequent B-scan frame.

17. The method according to claim 12,
wherein, in a case where the two-class classifier determines that the fluorescence data value of the potential error frame is not a fluorescence artifact, the method further comprises maintaining the fluorescence data value of the potential error frame as a true fluorescence data value of a correct B-scan data frame.

18. The method according to claim 11,
wherein the parameter value of the fluorescence data values includes one or more of a signal intensity value, a signal peak value, and signal mean value of the fluorescence signal in each B-scan frame, and
wherein the method further comprises:
  calculating a standard deviation of the fluorescence signal of each B-scan frame using the one or more of the signal intensity value, the signal peak value, and the signal mean value of the fluorescence signal in each B-scan frame,
  sorting the standard deviation values from lowest to highest along a standard deviation curve for the plurality of B-scan frames of the multimodality image;
  calculating a straight line from the lowest to the highest point of the standard deviation curve;
  calculating a perpendicular distance from the straight line to each point along the standard deviation curve; and
  define, as the threshold value, the value along the standard deviation curve that corresponds to the longest perpendicular distance from the straight line to the standard deviation curve.

19. A non-transitory computer-readable medium configured to store instructions that when executed by one or more processors of a computing device, cause the computing device to perform the method according to claim 11.

* * * * *